(12) United States Patent
Driscoll et al.

(10) Patent No.: US 12,498,203 B2
(45) Date of Patent: Dec. 16, 2025

(54) ELECTRODE FOR A CONDUCTED ELECTRICAL WEAPON

(71) Applicant: Axon Enterprise, Inc., Scottsdale, AZ (US)

(72) Inventors: Samuel R. Driscoll, Phoenix, AZ (US); John Groff, San Francisco, CA (US); Trevor Scott, Chandler, AZ (US); Landon Romney, Queen Creek, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 88 days.

(21) Appl. No.: 18/224,995

(22) Filed: Jul. 21, 2023

(65) Prior Publication Data

US 2024/0035780 A1     Feb. 1, 2024

Related U.S. Application Data

(60) Provisional application No. 63/393,190, filed on Jul. 28, 2022.

(51) Int. Cl.
*F41H 13/00*     (2006.01)

(52) U.S. Cl.
CPC ................. *F41H 13/0025* (2013.01)

(58) Field of Classification Search
CPC .................................... F41H 13/0025
USPC ........................................... 361/232
See application file for complete search history.

(56) References Cited

U.S. PATENT DOCUMENTS

| | | | |
|---|---|---|---|
| 2,685,383 | A | 8/1954 | Kochner |
| 2,926,566 | A | 3/1960 | Atkins et al. |
| 3,440,797 | A | 4/1969 | Spielman |
| 3,803,463 | A | 4/1974 | Cover |
| 4,253,132 | A | 2/1981 | Cover |
| 5,831,199 | A | 11/1998 | McNulty, Jr. et al. |

(Continued)

FOREIGN PATENT DOCUMENTS

| | | |
|---|---|---|
| CN | 1818532 A | 8/2006 |
| CN | 104613811 A | 5/2015 |

(Continued)

OTHER PUBLICATIONS

Korean Intellectual Property Office, International Search Report for International Application No. PCT/US2023/028370 mailed Apr. 24, 2024.

(Continued)

*Primary Examiner* — Sreeya Sreevatsa
(74) *Attorney, Agent, or Firm* — Justin Powley

(57) ABSTRACT

An electrode for a conducted electrical weapon may comprise an electrode body and an electrode head coupled to a first end of the electrode body. The electrode head may comprise one or more circumferential grooves. A filament may be stored in the electrode body and may be circumferentially wound into the one or more circumferential grooves to couple the filament to the electrode head. The electrode may comprise an absorber coupled to the electrode head. The absorber may comprise a core to provide rigidity and structure to the absorber. An impact spreader may be positioned forward the absorber. In response to an impact, the impact spreader may provide a force to the absorber to cause the absorber to expand radially outward.

20 Claims, 8 Drawing Sheets

(56) References Cited

U.S. PATENT DOCUMENTS

| | | |
|---|---|---|
| 6,161,598 A | 12/2000 | Eder et al. |
| 6,877,434 B1 | 4/2005 | McNulty, Jr. |
| 7,042,696 B2 | 5/2006 | Smith et al. |
| 7,234,262 B2 | 6/2007 | Smith |
| 7,327,549 B2 | 2/2008 | Smith et al. |
| 7,444,939 B2 | 11/2008 | McNulty et al. |
| 7,444,940 B2 | 11/2008 | Kapeles et al. |
| 7,475,508 B1 | 1/2009 | Walker |
| 7,950,176 B1 | 5/2011 | Nemtyshkin et al. |
| 7,950,329 B1 * | 5/2011 | Nemtyshkin ............ F42B 12/36 102/504 |
| 7,984,676 B1 | 7/2011 | Gavin et al. |
| 8,074,573 B1 | 12/2011 | Linker |
| 8,339,763 B2 | 12/2012 | McNulty et al. |
| 8,342,098 B2 | 1/2013 | Shalev et al. |
| 8,837,107 B2 | 9/2014 | Hinz |
| 8,896,892 B2 | 11/2014 | Wen |
| 9,435,619 B1 | 9/2016 | Park |
| 9,638,498 B2 | 5/2017 | Chang |
| 10,066,905 B2 | 9/2018 | Heroor et al. |
| 10,161,722 B1 * | 12/2018 | Salisbury ............ F41H 13/0025 |
| 10,168,127 B1 | 1/2019 | Salisbury et al. |
| 10,598,467 B1 | 3/2020 | Mcdermit et al. |
| 10,731,953 B2 | 8/2020 | Petrovic et al. |
| 11,041,698 B2 | 6/2021 | Nemtyshkin et al. |
| 2005/0109200 A1 | 5/2005 | McNulty |
| 2006/0187610 A1 | 8/2006 | Su |
| 2006/0207466 A1 | 9/2006 | McNulty et al. |
| 2006/0254108 A1 | 11/2006 | Park |
| 2006/0279898 A1 | 12/2006 | Smith et al. |
| 2007/0019357 A1 | 1/2007 | Keely |
| 2007/0214993 A1 | 9/2007 | Cerovic et al. |
| 2010/0050856 A1 | 3/2010 | Baldwin |
| 2010/0275806 A1 | 11/2010 | Gavin et al. |
| 2012/0019975 A1 | 1/2012 | Hanchett et al. |
| 2012/0170167 A1 | 7/2012 | Beechey et al. |
| 2014/0233146 A1 | 8/2014 | Gavin |
| 2014/0293499 A1 | 10/2014 | Beechey et al. |
| 2015/0002981 A1 | 1/2015 | Klug et al. |
| 2015/0153144 A1 | 6/2015 | Cheatham, III et al. |
| 2015/0329341 A1 | 11/2015 | Wilder et al. |
| 2016/0010956 A1 | 1/2016 | Hanchett |
| 2016/0010957 A1 | 1/2016 | Beechey et al. |
| 2016/0279433 A1 | 9/2016 | Cheatham, III et al. |
| 2017/0059661 A1 | 3/2017 | Foldyna |
| 2017/0258583 A1 | 9/2017 | McCawley et al. |
| 2017/0304639 A1 | 10/2017 | Cheatham, III et al. |
| 2018/0283829 A1 | 10/2018 | Petrovic et al. |
| 2019/0128650 A1 | 5/2019 | Kim |
| 2020/0064108 A1 * | 2/2020 | Salisbury ............ F41H 13/0025 |
| 2020/0109933 A1 | 4/2020 | Brundula et al. |
| 2020/0158475 A1 * | 5/2020 | Salisbury ............ F41H 13/0025 |
| 2021/0310772 A1 | 10/2021 | Chirila |
| 2022/0082357 A1 | 3/2022 | Smith et al. |
| 2022/0228841 A1 | 7/2022 | Smith et al. |
| 2023/0148190 A1 | 5/2023 | Nemtyshkin et al. |

FOREIGN PATENT DOCUMENTS

| | | |
|---|---|---|
| CN | 205425968 U | 8/2016 |
| CN | 205957818 U | 2/2017 |
| CN | 207351302 U | 5/2018 |
| CN | 106767174 B | 8/2018 |
| CN | 108444337 A | 8/2018 |
| CN | 210426267 U | 4/2020 |
| EP | 0849770 A2 | 6/1998 |
| KR | 101872709 B1 | 7/2018 |
| KR | 101890759 B1 | 8/2018 |
| RU | 2275576 C1 | 4/2006 |
| RU | 68671 U1 | 11/2007 |
| RU | 2351871 C1 | 4/2009 |
| RU | 2477441 C1 | 3/2013 |
| RU | 2480704 C2 | 4/2013 |
| RU | 2526159 C2 | 8/2014 |
| RU | 2527242 C2 | 8/2014 |
| RU | 2648562 C1 | 3/2018 |
| TW | 202028688 A | 8/2020 |
| WO | 20090025575 A1 | 2/2009 |
| WO | 2011011365 A2 | 1/2011 |
| WO | 2012082012 A2 | 6/2012 |
| WO | 2012128670 A2 | 9/2012 |
| WO | 2018194701 A1 | 10/2018 |
| WO | WO-2020136294 A1 * | 7/2020 ......... F41H 13/0025 |
| WO | 2021101604 A1 | 5/2021 |

OTHER PUBLICATIONS

Taiwan Patent Office, Office Action for Taiwan Application No. 112127917 mailed Sep. 3, 2024.

* cited by examiner

ELECTRODE FOR A CONDUCTED ELECTRICAL WEAPON

FIELD OF THE INVENTION

Embodiments of the present disclosure relate to a conducted electrical weapon ("CEW").

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
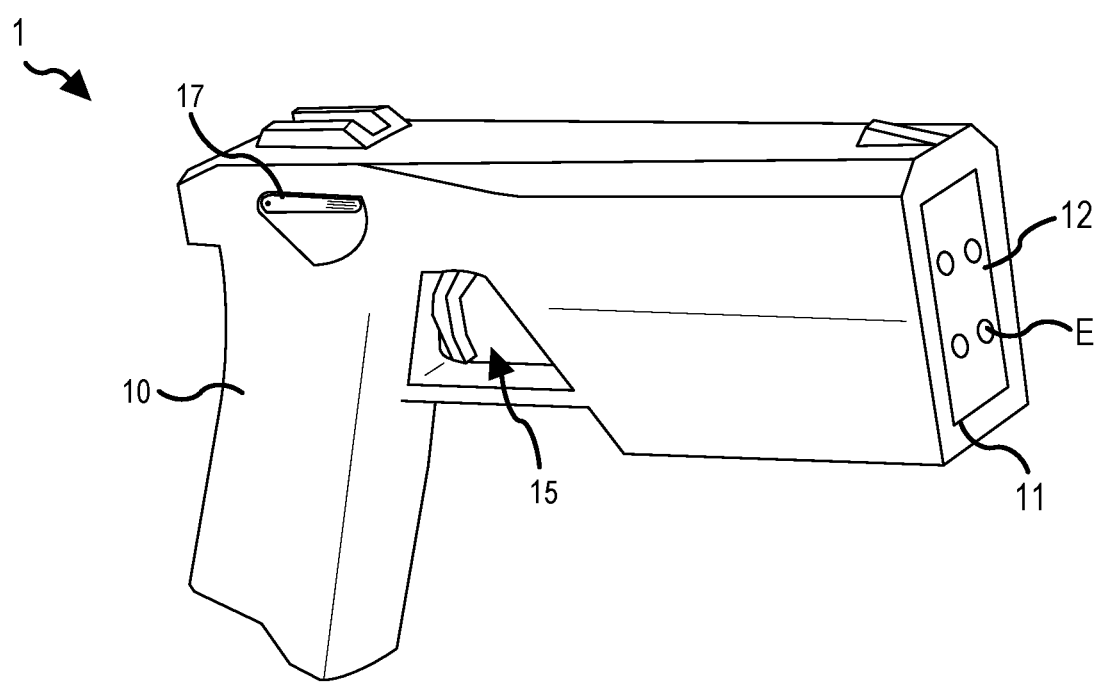
FIG. 1 is a perspective view of a conducted electrical weapon ("CEW"), in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, an electronic control device, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a magazine. The terminals are spaced apart from each other. In response to the electrodes of the magazine in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more magazines. The handle may include one or more bays for receiving the magazine(s). Each magazine may be removably positioned in (e.g., inserted into, coupled to, etc.) a bay. Each magazine may releasably electrically, electronically, and/or mechanically couple to a bay. A deployment of the CEW may launch one or more electrodes from the magazine and toward a target to remotely deliver the stimulus signal through the target.

In various embodiments, a magazine may include two or more electrodes (e.g., projectiles, etc.) that are launched at the same time. In various embodiments, a magazine may include two or more electrodes that may each be launched individually at separate times. In various embodiments, a magazine may include a single electrode configured to be launched from the magazine. Launching the electrodes may be referred to as activating (e.g., firing) a magazine or electrode. In some embodiments, after use (e.g., activation, firing), a magazine may be removed from the bay and the used electrodes may be removed from the magazine and replaced with unused (e.g., not fired, not activated) electrodes. The magazine may be inserted into the bay again to permit launch of additional electrodes. In some embodiments, after use (e.g., activation, firing), a magazine may be removed from the bay and replaced with an unused (e.g., not fired, not activated) magazine to permit launch of additional electrodes.

Figure 2:
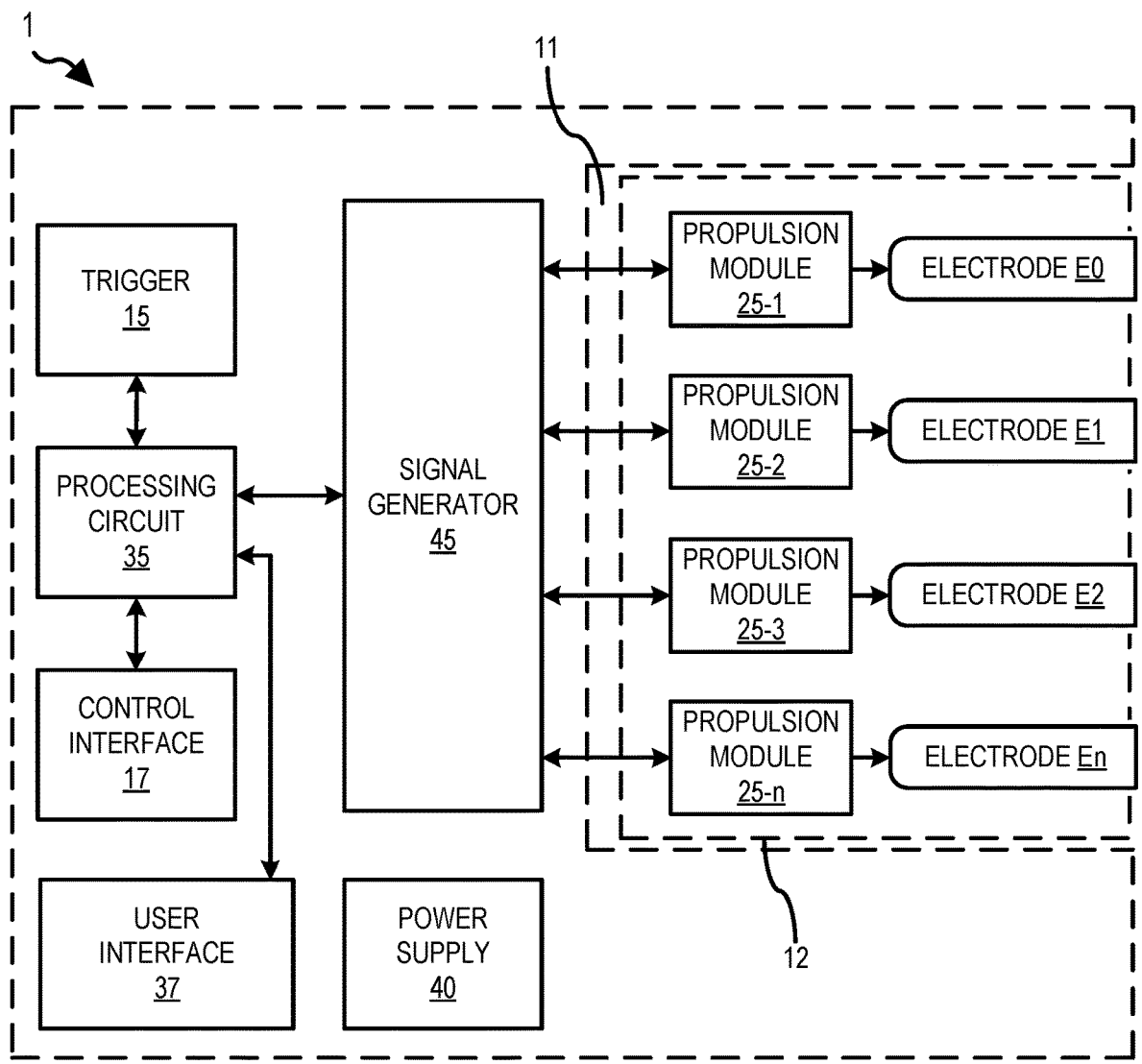
FIG. 2 is a schematic view of a CEW, in accordance with various embodiments.

In various embodiments, and with reference to FIGS. 1 and 2, a CEW 1 is disclosed. CEW 1 may be similar to, or have similar aspects and/or components with, any CEW discussed herein. CEW 1 may comprise a housing 10 and a magazine 12. It should be understood by one skilled in the art that FIG. 2 is a schematic representation of CEW 1, and one or more of the components of CEW 1 may be located in any suitable position within, or external to, housing 10.

Housing 10 may be configured to house various components of CEW 1 that are configured to enable deployment of magazine 12, provide an electrical current to magazine 12, and otherwise aid in the operation of CEW 1, as discussed further herein. Although depicted as a firearm in FIG. 1, housing 10 may comprise any suitable shape and/or size.

Housing 10 may comprise a handle end opposite a deployment end. A deployment end may be configured, and sized and shaped, to receive one or more magazine 12. A handle end may be sized and shaped to be held in a hand of a user. For example, a handle end may be shaped as a handle to enable hand-operation of CEW 1 by the user. In various embodiments, a handle end may also comprise contours shaped to fit the hand of a user, for example, an ergonomic grip. A handle end may include a surface coating, such as, for example, a non-slip surface, a grip pad, a rubber texture, and/or the like. As a further example, a handle end may be wrapped in leather, a colored print, and/or any other suitable material, as desired.

In various embodiments, housing 10 may comprise various mechanical, electronic, and/or electrical components configured to aid in performing the functions of CEW 1. For example, housing 10 may comprise one or more triggers 15, control interfaces 17, processing circuits 35, power supplies 40, and/or signal generators 45. Housing 10 may include a guard (e.g., trigger guard). A guard may define an opening formed in housing 10. A guard may be located on a center region of housing 10 (e.g., as depicted in FIG. 1), and/or in any other suitable location on housing 10. Trigger 15 may be disposed within a guard. A guard may be configured to protect trigger 15 from unintentional physical contact (e.g., an unintentional activation of trigger 15). A guard may surround trigger 15 within housing 10.

In various embodiments, trigger 15 be coupled to an outer surface of housing 10, and may be configured to move, slide, rotate, or otherwise become physically depressed or moved upon application of physical contact. For example, trigger 15 may be actuated by physical contact applied to trigger 15 from within a guard. Trigger 15 may comprise a mechanical or electromechanical switch, button, trigger, or the like. For example, trigger 15 may comprise a switch, a pushbutton, and/or any other suitable type of trigger. Trigger 15 may be mechanically and/or electronically coupled to processing circuit 35. In response to trigger 15 being activated (e.g., depressed, pushed, etc. by the user), processing circuit 35 may enable deployment of (or cause deployment of) one or more magazine 12 from CEW 1, as discussed further herein.

In various embodiments, power supply 40 may be configured to provide power to various components of CEW 1. For example, power supply 40 may provide energy for operating the electronic and/or electrical components (e.g., parts, subsystems, circuits, etc.) of CEW 1 and/or one or more magazine 12. Power supply 40 may provide electrical power. Providing electrical power may include providing a current at a voltage. Power supply 40 may be electrically coupled to processing circuit 35 and/or signal generator 45. In various embodiments, in response to a control interface comprising electronic properties and/or components, power supply 40 may be electrically coupled to the control interface. In various embodiments, in response to trigger 15 comprising electronic properties or components, power supply 40 may be electrically coupled to trigger 15. Power supply 40 may provide an electrical current at a voltage. Electrical power from power supply 40 may be provided as a direct current ("DC"). Electrical power from power supply 40 may be provided as an alternating current ("AC"). Power supply 40 may include a battery. The energy of power supply 40 may be renewable or exhaustible, and/or replaceable. For example, power supply 40 may comprise one or more rechargeable or disposable batteries. In various embodiments, the energy from power supply 40 may be converted from one form (e.g., electrical, magnetic, thermal) to another form to perform the functions of a system.

Power supply 40 may provide energy for performing the functions of CEW 1. For example, power supply 40 may provide the electrical current to signal generator 45 that is provided through a target to impede locomotion of the target (e.g., via magazine 12). Power supply 40 may provide the energy for a stimulus signal. Power supply 40 may provide the energy for other signals, including an ignition signal, as discussed further herein.

In various embodiments, processing circuit 35 may comprise any circuitry, electrical components, electronic components, software, and/or the like configured to perform various operations and functions discussed herein. For example, processing circuit 35 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 35 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 35 may include data buses, output ports, input ports, timers, memory, arithmetic units, and/or the like.

In various embodiments, processing circuit 35 may include signal conditioning circuitry. Signal conditioning circuitry may include level shifters to change (e.g., increase, decrease) the magnitude of a voltage (e.g., of a signal) before receipt by processing circuit 35 or to shift the magnitude of a voltage provided by processing circuit 35.

In various embodiments, processing circuit 35 may be configured to control and/or coordinate operation of some or all aspects of CEW 1. For example, processing circuit 35 may include (or be in communication with) memory configured to store data, programs, and/or instructions. The memory may comprise a tangible non-transitory computer-readable memory. Instructions stored on the tangible non-transitory memory may allow processing circuit 35 to perform various operations, functions, and/or steps, as described herein.

In various embodiments, the memory may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Processing circuit 35 may be configured to provide and/or receive electrical signals whether digital and/or analog in form. Processing circuit 35 may provide and/or receive digital information via a data bus using any protocol. Processing circuit 35 may receive information, manipulate the received information, and provide the manipulated information. Processing circuit 35 may store information and retrieve stored information. Information received, stored, and/or manipulated by processing circuit 35 may be used to perform a function, control a function, and/or to perform an operation or execute a stored program.

Processing circuit 35 may control the operation and/or function of other circuits and/or components of CEW 1.

Processing circuit 35 may receive status information regarding the operation of other components, perform calculations with respect to the status information, and provide commands (e.g., instructions) to one or more other components. Processing circuit 35 may command another component to start operation, continue operation, alter operation, suspend operation, cease operation, or the like. Commands and/or status may be communicated between processing circuit 35 and other circuits and/or components via any type of bus (e.g., SPI bus) including any type of data/address bus.

In various embodiments, processing circuit 35 may be mechanically and/or electronically coupled to trigger 15. Processing circuit 35 may be configured to detect an activation, actuation, depression, input, etc. (collectively, an "activation event") of trigger 15. In response to detecting the activation event, processing circuit 35 may be configured to perform various operations and/or functions, as discussed further herein. Processing circuit 35 may also include a sensor (e.g., a trigger sensor) attached to trigger 15 and configured to detect an activation event of trigger 15. The sensor may comprise any suitable sensor, such as a mechanical and/or electronic sensor capable of detecting an activation event in trigger 15 and reporting the activation event to processing circuit 35.

In various embodiments, processing circuit 35 may be mechanically and/or electronically coupled to control interface 17. Processing circuit 35 may be configured to detect an activation, actuation, depression, input, etc. (collectively, a "control event") of control interface 17. In response to detecting the control event, processing circuit 35 may be configured to perform various operations and/or functions, as discussed further herein. Processing circuit 35 may also include a sensor (e.g., a control sensor) attached to control interface 17 and configured to detect a control event of control interface 17. The sensor may comprise any suitable mechanical and/or electronic sensor capable of detecting a control event in control interface 17 and reporting the control event to processing circuit 35.

In various embodiments, processing circuit 35 may be electrically and/or electronically coupled to power supply 40. Processing circuit 35 may receive power from power supply 40. The power received from power supply 40 may be used by processing circuit 35 to receive signals, process signals, and transmit signals to various other components in CEW 1. Processing circuit 35 may use power from power supply 40 to detect an activation event of trigger 15, a control event of control interface 17, or the like, and generate one or more control signals in response to the detected events. The control signal may be based on the control event and the activation event. The control signal may be an electrical signal.

In various embodiments, processing circuit 35 may be electrically and/or electronically coupled to signal generator 45. Processing circuit 35 may be configured to transmit or provide control signals to signal generator 45 in response to detecting an activation event of trigger 15. Multiple control signals may be provided from processing circuit 35 to signal generator 45 in series. In response to receiving the control signal, signal generator 45 may be configured to perform various functions and/or operations, as discussed further herein.

In various embodiments, signal generator 45 may be configured to receive one or more control signals from processing circuit 35. Signal generator 45 may provide an ignition signal to magazine 12 based on the control signals. Signal generator 45 may be electrically and/or electronically coupled to processing circuit 35 and/or magazine 12. Signal generator 45 may be electrically coupled to power supply 40. Signal generator 45 may use power received from power supply 40 to generate an ignition signal. For example, signal generator 45 may receive an electrical signal from power supply 40 that has first current and voltage values. Signal generator 45 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 45 may temporarily store power from power supply 40 and rely on the stored power entirely or in part to provide the ignition signal. Signal generator 45 may also rely on received power from power supply 40 entirely or in part to provide the ignition signal, without needing to temporarily store power.

Signal generator 45 may be controlled entirely or in part by processing circuit 35. In various embodiments, signal generator 45 and processing circuit 35 may be separate components (e.g., physically distinct and/or logically discrete). Signal generator 45 and processing circuit 35 may be a single component. For example, a control circuit within housing 10 may at least include signal generator 45 and processing circuit 35. The control circuit may also include other components and/or arrangements, including those that further integrate corresponding function of these elements into a single component or circuit, as well as those that further separate certain functions into separate components or circuits.

Signal generator 45 may be controlled by the control signals to generate an ignition signal having a predetermined current value or values. For example, signal generator 45 may include a current source. The control signal may be received by signal generator 45 to activate the current source at a current value of the current source. An additional control signal may be received to decrease a current of the current source. For example, signal generator 45 may include a pulse width modification circuit coupled between a current source and an output of the control circuit. A second control signal may be received by signal generator 45 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 45 may alternatively or additionally be employed, including those that apply a voltage over one or more different resistances to generate signals with different currents. In various embodiments, signal generator 45 may include a high-voltage module configured to deliver an electrical current having a high voltage. In various embodiments, signal generator 45 may include a low-voltage module configured to deliver an electrical current having a lower voltage, such as, for example, 2,000 volts.

Responsive to receipt of a signal indicating activation of trigger 15 (e.g., an activation event), a control circuit provides an ignition signal to magazine 12 (or an electrode in magazine 12). For example, signal generator 45 may provide an electrical signal as an ignition signal to magazine 12 in response to receiving a control signal from processing circuit 35. In various embodiments, the ignition signal may be separate and distinct from a stimulus signal. For example, a stimulus signal in CEW 1 may be provided to a different circuit within magazine 12, relative to a circuit to which an ignition signal is provided. Signal generator 45 may be configured to generate a stimulus signal. In various embodiments, a second, separate signal generator, component, or circuit (not shown) within housing 10 may be configured to generate the stimulus signal. Signal generator 45 may also provide a ground signal path for magazine 12, thereby completing a circuit for an electrical signal provided to magazine 12 by signal generator 45. The ground signal path may also be provided to magazine 12 by other elements in housing 10, including power supply 40.

In various embodiments, a bay 11 of housing 10 may be configured to receive one or more magazine 12. Bay 11 may comprise an opening in an end of housing 10 sized and shaped to receive one or more magazine 12. Bay 11 may include one or more mechanical features configured to removably couple one or more magazine 12 within bay 11. Bay 11 of housing 10 may be configured to receive a single magazine, two magazines, three magazines, nine magazines, or any other number of magazines.

Magazine 12 may comprise one or more propulsion modules 25 and one or more electrodes E. For example, a magazine 12 may comprise a single propulsion module 25 configured to deploy a single electrode E. As a further example, a magazine 12 may comprise a single propulsion module 25 configured to deploy a plurality of electrodes E. As a further example, a magazine 12 may comprise a plurality of propulsion modules 25 and a plurality of electrodes E, with each propulsion module 25 configured to deploy one or more electrodes E. In various embodiments, and as depicted in FIG. 2, magazine 12 may comprise a first propulsion module 25-1 configured to deploy a first electrode E0, a second propulsion module 25-2 configured to deploy a second electrode E1, a third propulsion module 25-3 configured to deploy a third electrode E2, and a fourth propulsion module 25-4 configured to deploy a fourth electrode En. Each series of propulsion modules and electrodes may be contained in the same and/or separate magazines. As referred to herein, electrodes E0, E1, E2, En may be generally referred to individually as an "electrode E" or collectively as "electrodes E." As referred to herein, propulsion modules 25-1, 25-2, 25-3, 25-n may be referred to individually as a "propulsion module 25" or collectively as "propulsion modules 25."

In various embodiments, a propulsion module 25 may be coupled to, or in communication with one or more electrodes E in magazine 12. In various embodiments, magazine 12 may comprise a plurality of propulsion modules 25, with each propulsion module 25 coupled to, or in communication with, one or more electrodes E. A propulsion module 25 may comprise any device, propellant (e.g., air, gas, etc.), primer, or the like capable of providing a propulsion force in magazine 12. The propulsion force may include an increase in pressure caused by rapidly expanding gas within an area or chamber. The propulsion force may be applied to one or more electrodes E in magazine 12 to cause the deployment of the one or more electrodes E. A propulsion module 25 may provide the propulsion force in response to magazine 12 receiving an ignition signal, as previously discussed.

In various embodiments, the propulsion force may be directly applied to one or more electrodes E. For example, a propulsion force from propulsion module 25-1 may be provided directly to first electrode E0. A propulsion module 25 may be in fluid communication with one or more electrodes E to provide the propulsion force. For example, a propulsion force from propulsion module 25-1 may travel within a housing or channel of magazine 12 to first electrode E0. The propulsion force may travel via a manifold in magazine 12.

In various embodiments, the propulsion force may be provided indirectly to one or more electrodes E. For example, the propulsion force may be provided to a secondary source of propellant within propulsion system 125. The propulsion force may launch the secondary source of propellant within propulsion system 125, causing the secondary source of propellant to release propellant. A force associated with the released propellant may in turn provide a force to one or more electrodes E. A force generated by a secondary source of propellant may cause the one or more electrodes E to be deployed from the magazine 12 and CEW 1.

In various embodiments, an electrode E may comprise any suitable type of projectile. For example, one or more electrodes E may be or include a projectile, a probe, an electrode (e.g., an electrode dart), an entangling projectile (e.g., a tether-based entangling projectile, a net, etc.), a payload projectile (e.g., comprising a liquid or gas substance), or the like. An electrode may include a spear portion, designed to pierce or attach proximate a tissue of a target in order to provide a conductive electrical path between the electrode and the tissue, as previously discussed herein.

In various embodiments, magazine 12 may be configured to receive one or more cartridges. For example, magazine 12 may define one or more bores. A bore may comprise an axial opening through magazine 12. Each bore may be configured to receive a cartridge. Each bore may be sized and shaped accordingly to receive and house the cartridge. Each bore may comprise any suitable deployment angle. One or more bores may comprise similar deployment angles. One or more bores may comprise different deployment angles. Magazine 12 may comprise any suitable or desired number of bores, such as, for example, two bores, five bores, nine bores, ten bores, and/or the like.

A cartridge may comprise a body (e.g., a cartridge body) housing an electrode E and one or more components necessary to deploy the electrode E from the body. For example, a cartridge may comprise an electrode E and a propulsion module. The propulsion module may be similar to any other propulsion module, primer, or the like disclosed herein.

In various embodiments, a cartridge may comprise a cylindrical outer body defining a hollow inner portion. The hollow inner portion may house an electrode E (e.g., an electrode E, a spear, filament wire, etc.). The hollow inner portion may house a propulsion module configured to deploy the electrode E from a first end of the cylindrical outer body. The cartridge may include a piston positioned adjacent a second end of the electrode E. The cartridge may have the propulsion module positioned such that the piston is located between the electrode E and the propulsion module. The cartridge may also have a wad positioned adjacent the piston, where the wad is located between the propulsion module and the piston.

In various embodiments, a cartridge may comprise a contact on an end of the body. The contact may be configured to allow the cartridge to receive an electrical signal from a CEW handle. For example, the contact may comprise an electrical contact configured to enable the completion of an electrical circuit between the cartridge and a signal generator of the CEW handle. In that regard, the contact may be configured to transmit (or provide) a stimulus signal from the CEW handle to the electrode E. As a further example, the contact may be configured to transmit (or provide) an electrical signal (e.g., an ignition signal) from the CEW handle to a propulsion module within the cartridge. For example, the contact may be configured to transmit (or provide) the electrical signal to a conductor of the propulsion module, thereby causing the conductor to heat up and ignite a pyrotechnic material inside the propulsion module. Ignition of the pyrotechnic material may cause the propulsion module to deploy (e.g., directly or indirectly) the electrode E from the cartridge.

In operation, a cartridge may be inserted into a bore of magazine 12. Magazine 12 may be inserted into the bay of a CEW handle. The CEW may be operated to deploy an electrode E from the cartridge in magazine 12. Magazine 12 may be removed from the bay of the CEW handle. The cartridge (e.g., a used cartridge, a spent cartridge, etc.) may be removed from the bore of magazine 12. A new cartridge may then be inserted into the same bore of magazine 12 for additional deployments. The number of cartridges that magazine 12 is capable of receiving may be dependent on a number of bores in magazine 12. For example, in response to magazine 12 comprising ten bores, magazine 12 may be configured to receive at most ten cartridges at the same time. As a further example, in response to magazine 12 comprising two bores, magazine 312 may be configured to receive at most two cartridges at the same time.

Control interface 17 of CEW 1 may comprise, or be similar to, any control interface disclosed herein. In various embodiments, control interface 17 may be configured to control selection of firing modes in CEW 1. Controlling selection of firing modes in CEW 1 may include disabling firing of CEW 1 (e.g., a safety mode, etc.), enabling firing of CEW 1 (e.g., an active mode, a firing mode, an escalation mode, etc.), controlling deployment of magazine 12, and/or similar operations, as discussed further herein. In various embodiments, control interface 17 may also be configured to perform (or cause performance of) one or more operations that do not include the selection of firing modes. For example, control interface 17 may be configured to enable the selection of operating modes of CEW 1, selection of options within an operating mode of CEW 1, or similar selection or scrolling operations, as discussed further herein.

Control interface 17 may be located in any suitable location on or in housing 10. For example, control interface 17 may be coupled to an outer surface of housing 10. Control interface 17 may be coupled to an outer surface of housing 10 proximate trigger 15 and/or a guard of housing 10. Control interface 17 may be electrically, mechanically, and/or electronically coupled to processing circuit 35. In various embodiments, in response to control interface 17 comprising electronic properties or components, control interface 17 may be electrically coupled to power supply 40. Control interface 17 may receive power (e.g., electrical current) from power supply 40 to power the electronic properties or components.

Control interface 17 may be electronically or mechanically coupled to trigger 15. For example, and as discussed further herein, control interface 17 may function as a safety mechanism. In response to control interface 17 being set to a "safety mode," CEW 1 may be unable to launch electrodes from magazine 12. For example, control interface 17 may provide a signal (e.g., a control signal) to processing circuit 35 instructing processing circuit 35 to disable deployment of electrodes from magazine 12. As a further example, control interface 17 may electronically or mechanically prohibit trigger 15 from activating (e.g., prevent or disable a user from depressing trigger 15; prevent trigger 15 from launching an electrode; etc.).

Control interface 17 may comprise any suitable electronic or mechanical component capable of enabling selection of firing modes. For example, control interface 17 may comprise a fire mode selector switch, a safety switch, a safety catch, a rotating switch, a selection switch, a selective firing mechanism, and/or any other suitable mechanical control. As a further example, control interface 17 may comprise a slide, such as a handgun slide, a reciprocating slide, or the like. As a further example, control interface 17 may comprise a touch screen, user interface or display, or similar electronic visual component.

The safety mode may be configured to prohibit deployment of an electrode from magazine 12 in CEW 1. For example, in response to a user selecting the safety mode, control interface 17 may transmit a safety mode instruction to processing circuit 35. In response to receiving the safety mode instruction, processing circuit 35 may prohibit deployment of an electrode from magazine 12. Processing circuit 35 may prohibit deployment until a further instruction is received from control interface 17 (e.g., a firing mode instruction). As previously discussed, control interface 17 may also, or alternatively, interact with trigger 15 to prevent activation of trigger 15. In various embodiments, the safety mode may also be configured to prohibit deployment of a stimulus signal from signal generator 45, such as, for example, a local delivery.

The firing mode may be configured to enable deployment of one or more electrodes from magazine 12 in CEW 1. For example, and in accordance with various embodiments, in response to a user selecting the firing mode, control interface 17 may transmit a firing mode instruction to processing circuit 35. In response to receiving the firing mode instruction, processing circuit 35 may enable deployment of an electrode from magazine 12. In that regard, in response to trigger 15 being activated, processing circuit 35 may cause the deployment of one or more electrodes. Processing circuit 35 may enable deployment until a further instruction is received from control interface 17 (e.g., a safety mode instruction). As a further example, and in accordance with various embodiments, in response to a user selecting the firing mode, control interface 17 may also mechanically (or electronically) interact with trigger 15 of CEW 1 to enable activation of trigger 15.

In various embodiments, CEW 1 may deliver a stimulus signal via a circuit that includes signal generator 45 positioned in the handle of CEW 1. An interface (e.g., cartridge interface, magazine interface, etc.) on each magazine 12 inserted into housing 10 electrically couples to an interface (e.g., handle interface, housing interface, etc.) in handle housing 10. Signal generator 45 couples to each magazine 12, and thus to the electrodes E, via the handle interface and the magazine interface. A first filament couples to the interface of the magazine 12 and to a first electrode. A second filament couples to the interface of the magazine 12 and to a second electrode. The stimulus signal travels from signal generator 45, through the first filament and the first electrode, through target tissue, and through the second electrode and second filament back to signal generator 45.

In various embodiments, CEW 1 may further comprise one or more user interfaces 37. A user interface 37 may be configured to receive an input from a user of CEW 1 and/or transmit an output to the user of CEW 1. User interface 37 may be located in any suitable location on or in housing 10. For example, user interface 37 may be coupled to an outer surface of housing 10, or extend at least partially through the outer surface of housing 10. User interface 37 may be electrically, mechanically, and/or electronically coupled to processing circuit 35. In various embodiments, in response to user interface 37 comprising electronic or electrical properties or components, user interface 37 may be electrically coupled to power supply 40. User interface 37 may receive power (e.g., electrical current) from power supply 40 to power the electronic properties or components.

In various embodiments, user interface 37 may comprise one or more components configured to receive an input from a user. For example, user interface 37 may comprise one or more of an audio capturing module (e.g., microphone) configured to receive an audio input, a visual display (e.g., touchscreen, LCD, LED, etc.) configured to receive a manual input, a mechanical interface (e.g., button, switch, etc.) configured to receive a manual input, and/or the like. In various embodiments, user interface 37 may comprise one or more components configured to transmit or produce an output. For example, user interface 37 may comprise one or more of an audio output module (e.g., audio speaker) configured to output audio, a light-emitting component (e.g., flashlight, laser guide, etc.) configured to output light, a visual display (e.g., touchscreen, LCD, LED, etc.) configured to output a visual, and/or the like.

Figure 3A:
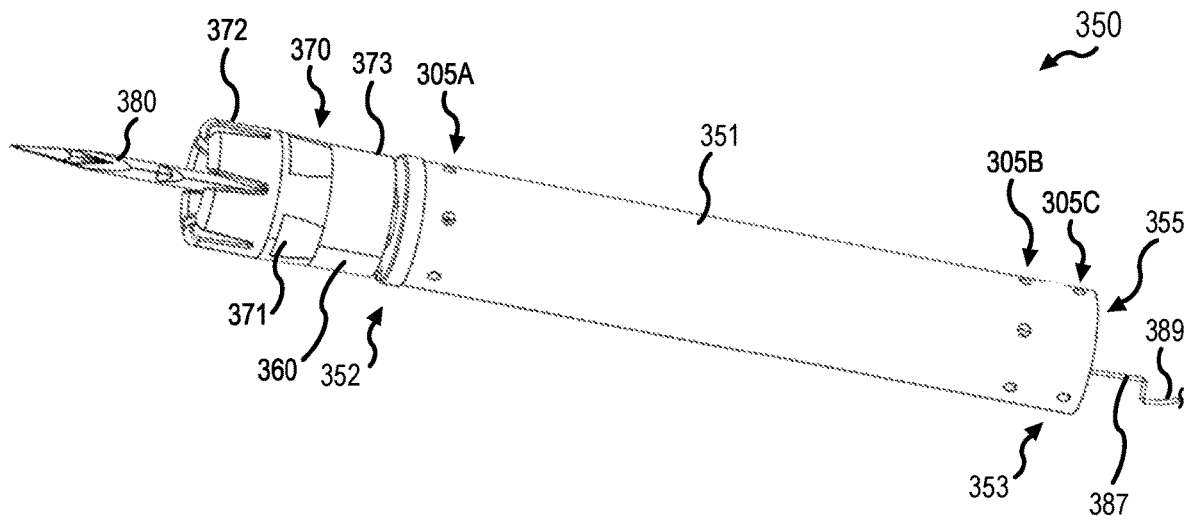
FIGS. 3A-3C are perspective and cross-sectional views of an electrode, in accordance with various embodiments.
Figure 3B:
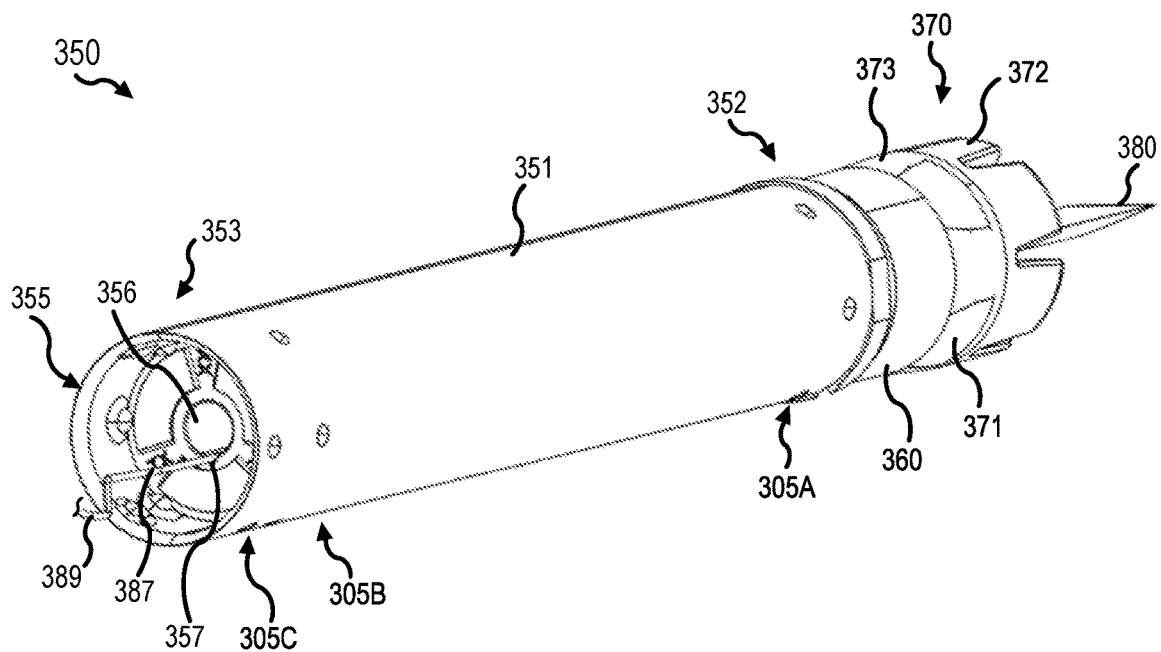
Figure 3C:
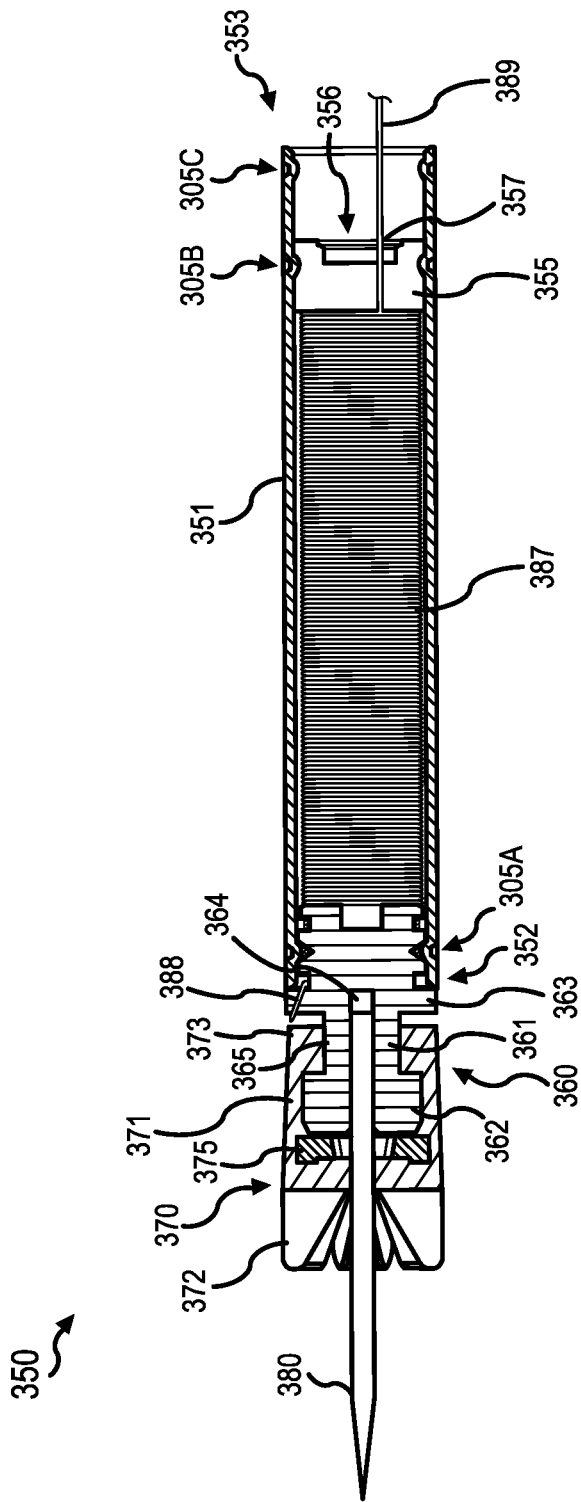

In various embodiments, and with reference to FIGS. 3A-3C, an electrode 350 is disclosed. Electrode 350 may be similar to any other electrode, projectile, or the like. Electrode 350 may be used in conjunction with any cartridge and/or magazine disclosed herein. Electrode 350 may comprise an electrode body 351 having a first end 352 (e.g., a first electrode end, a forward end, etc.) opposite a second end 353 (e.g., a second electrode end, an aft end, a rearward end, etc.). Electrode body 351 may comprise an outer surface opposite an inner surface. Electrode body 351 may define a cylindrical body. In some embodiments, a shape of electrode body 351 may be complimentary to a cartridge configured to receive electrode 350 (e.g., electrode body 351 may be complimentary with one or more inner surfaces of a cartridge).

In various embodiments, electrode 350 may comprise a head 360 (e.g., front head, electrode head, interchangeable head, etc.). Head 360 may comprise a body 361 (e.g., a head body, a front head body, etc.) having a first head end 362 opposite a second head end 363. Body 361 may define a middle section 365 between first head end 362 and second head end 363.

Second head end 363 may be coupled to electrode body 351 (e.g., at first end 352). Second head end 363 may be coupled to electrode body 351 such that a portion of head 360 is received within electrode body 351. The portion of head 360 received within electrode body 351 may be less than half of head 360. In some embodiments, the portion of head 360 received within electrode body 351 may be 30% of head 360. In some embodiments, the portion of head 360 received within electrode body 351 may be less than 40% of head 360; less than 40%, 30%, or 20% of head 360; about 40%, 30%, or 20% of head 360; and/or any other similar portion of head 360 (wherein "about" as used in this context refers only to +/−5%).

Head 360 may be configured to receive one or more attachments (e.g., head attachments, accessories, etc.). Head 360 may be configured to receive a single attachment. Head 360 may be configured to receive a plurality of attachments. An attachment may be configured to couple to a front surface (e.g., a radially forward surface) of first head end 362. An attachment may be configured to couple to an axially outer surface of first head end 362. An attachment may be configured to couple to head 360 proximate middle section 365 between first head end 362 and second head end 363. In some embodiments, an attachment may be configured to couple to head 360 at one or more of a front surface, an axially outer surface, and/or middle section 365 of head 360.

First head end 362 may be configured to receive a first attachment configured to enable electrode 350 to couple to a target. For example, the first attachment may comprise a spear (e.g., spear 380), a hook, a barb, a training attachment, a hook and loop attachment, and/or the like. In some embodiments, the first attachment may comprise an electrically conductive material.

First head end 362 may be configured to receive a second attachment configured to provide a property to electrode 350. The property may comprise a physical property, a physical characteristic, and/or the like. For example, the property may comprise an aerodynamic property. In that regard, the second attachment may be coupled to head 360 and configured to change an aerodynamic property or characteristic of electrode 350 (e.g., lift, drag, etc.). As a further example, the property may comprise a force absorbing property. In that regard, the second attachment may be coupled to head 360 and configured to at least partially reduce an impact force of electrode 350 against a target. The second attachment may at least partially absorb a force of impact with a target thereby reducing potential tissue or skin damage (e.g., bruising, tearing, etc.) to the target. The second attachment may reduce a momentum of electrode 350 after impact with a target, thereby hindering (e.g., preventing) electrode 350 from bouncing off of (e.g., deflecting) the target with enough residual force to decouple electrode 350 from a surface (e.g., clothing, tissue, etc.) of the target. The second attachment may comprise a pad, a shock absorber, a thermoplastic elastomer, a rubber, and/or the like. In various embodiments, the second attachment may comprise an electrically non-conductive material.

In various embodiments, a first attachment and a second attachment may couple to head 360 at first head end 362. In some embodiments, a second attachment may couple to each of head 360 and the first attachment. In various embodiments, head 360 may comprise a first mechanical feature configure to receive the first attachment and a second mechanical feature configured to receive the second attachment. The first mechanical feature may comprise an opening, channel, groove, protrusion, or the like. The second mechanical feature may comprise a shape of head 360.

In various embodiments, first head end 362 may be sized and shaped to receive one or more attachments. For example, first head end 362 may comprise a channel 364 (e.g., head channel, attachment channel, axial channel, etc.) configured to allow an attachment to couple to head 360. Channel 364 may define an opening on first head end 362 extending into a body of head 360. Channel 364 may not extend through to second head end 363. Channel 364 may be configured to receive a first attachment.

In some embodiments, electrode 350 may comprise a spear 380 coupled within channel 364. For example, spear 380 may be coupled within channel 364 mechanically or chemically. A mechanical coupling may comprise an interference fit, a press fit, a deformation, or the like. A chemical coupling may include an adhesive, and/or the like. Spear 380 may be coupled within channel 364 such that a gap exists between an end of spear 380 and an inner end of channel 364. In other embodiments, an end of spear 380 may abut against (e.g., contact) an inner end of channel 364.

First head end 362 may comprise a shape configured to receive an attachment. For example, head 360 at first head end 362 may comprise a "T-shape" wherein an outer portion of first head end 362 (e.g., a first portion) comprises a greater diameter than an inner portion of head end 362 (e.g., a second portion). The T-shape may be configured to receive a second attachment. The outer portion and the inner portion of first head end 362 may further at least partially define channel 364. The outer portion of first head end 362 may be axially forward the inner portion of first head end 362.

In various embodiments, electrode 350 may comprise an absorber 370 (e.g., a shock absorber, an impact absorber, a bumper, etc.). Absorber 370 may comprise an absorber body 371 having a first absorber end 372 (e.g., a forward absorber end) opposite a second absorber end 373 (e.g., an aft absorber end).

Absorber 370 may be coupled to head 360. Absorber 370 may be coupled to head 360 using a mechanical coupling, a chemical coupling, and/or the like. Absorber 370 may couple to head 360 at second absorber end 373. Absorber 370 may be coupled to first head end 362. Absorber 370 may be coupled to head 360 forward second head end 363. Absorber 370 may be coupled to middle section 365. Absorber 370 may be coupled to a T-shape defining first head end 362. Absorber 370 may comprise an outer surface radially outward an outer surface of head 360. Absorber 370 may comprise an aft inner surface that is radially inward from first head end 362 and second head end 363, but radially outward from middle section 365 of head 360. The aft inner surface may be defined at or proximate to second absorber end 373. The aft inner surface may be axially aft first head end 362 and axially forward second head end 363. In some embodiments, absorber 370 may be molded over head 360 such as, for example, using an injection molding process.

Absorber 370 may extend forward head 360. In some embodiments, absorber 370 may define an opening configured to receive spear 380. In some embodiments, absorber 370 may be coupled to spear 380.

Absorber 370 may be configured to at least partially absorb (or receive) a force of impact with a target thereby reducing potential tissue or skin damage (e.g., bruising, tearing, etc.) to the target. Absorber 370 may reduce a momentum of electrode 350 after impact with a target, thereby hindering (e.g., preventing) electrode 350 from bouncing off of (e.g., deflecting) the target with enough residual force to decouple electrode 350 from a surface (e.g., clothing, tissue, etc.) of the target. Absorber 370 may comprise a pad, a shock absorber, a thermoplastic elastomer, a rubber, and/or the like. In various embodiments, Absorber 370 may comprise an electrically non-conductive material. Spear 380 may comprise an electrically conductive material configured to provide a stimulus signal to the target.

In various embodiments, one or more portions of absorber 370 may be formed of a deformable (e.g., flexible, etc.) material. Upon impact with a target, the deformable material may be configured to elastically (e.g., temporarily, etc.) deform, or plastically (e.g., permanently, etc.) deform. The deformable material may include thermoplastic vulcanizates (e.g., SANTOPRENE), silicone rubbers, polyurethanes, polybutadienes, and other materials configured to deform upon impact with a target. The deformable material may include resilient materials (e.g., materials having high yield strengths and low moduli of elasticity, materials exhibiting spring-like properties, etc.). The deformable material may include elastomeric materials. The deformable material may include soft materials.

In various embodiments, absorber 370 may comprise a plurality of different structures and/or materials. For example, absorber 370 may comprise a first material configured to at least partially aid in absorbing a force of impact and a second material configured to provide further rigidity and/or structure of absorber 370. The first material may comprise an elastic material configured to deform and/or absorb the force of impact (as previously discussed), while the first material may comprise a more rigid material, such as a plastic (e.g., acrylic or polymethyl methacrylate (PMMA), polycarbonate (PC), polyethylene (PE), polypropylene (PP), polyethylene terephthalate (PETE or PET), polyvinyl chloride (PVC), acrylonitrile-butadiene-styrene (ABS), etc.). The first material may define an outer portion of absorber 370 to ensure absorber 370 deforms and/or absorbs the force of impact. The second material may define an inner portion of absorber 370 to provide rigidity and structure for absorber 370.

In various embodiments, absorber 370 may comprise a core 375. Core 375 may be disposed within absorber body 371 between first absorber end 372 and second absorber end 373. Core 375 may be at least partially enclosed by absorber body 371. Core 375 may be fully enclosed by absorber body 371 (e.g., core 375 is radially inward from an outer surface or absorber body 371) or may at least a portion of core 375 may not be enclosed by absorber body 371. In some embodiments, core 375 may contact first head end 362 in response to absorber 370 being coupled to head 360. Core 375 may be configured to provide a structure and/or rigidity to absorber 370. In that regard, core 375 may comprise any size and/or shape suitable to provide structure and/or rigidity to absorber 370. For example, core 375 may comprise a circular shape, a ring shape, and/or the like extending in a direction radially outward from spear 380. As a further example, core 375 may comprise one or more surfaces extending in an axially forward direction towards first absorber end 372. For example, core 375 may define one or more arms located at each radial end of core 375. Each arm may extend in an axially forward direction towards first absorber end 372.

Core 375 may comprise any suitable material configured to provide rigidity and/or structure to absorber 370. In some embodiments, core 375 may comprise a material different than a material of absorber body 371. For example, and as discussed above, absorber body 371 may comprise a first material configured to deform and/or absorb a force of impact, and core 375 may comprise a second material configured to provide rigidity and/or structure to absorber 370.

In various embodiments, first absorber end 372 may comprise one or more features, structures, or the like configured to at least partially aid in absorber 370 absorbing (or receiving) a force of impact with a target. First absorber end 372 may be configured to reduce shock provided by an impact (e.g., collision) of electrode 350 and the target. First absorber end 372 may be configured to minimize blunt impact and/or penetration of the forward portion of electrode 350 with the target by distributing the impact force (e.g., force of impact, etc.) of electrode 350 over a greater impact area (e.g., area of impact, contact area, surface contact area, etc.), distributing the impact force of electrode 350 over a longer duration (e.g., increasing a duration of impact, etc.), and/or absorbing kinetic energy of electrode 350. First absorber end 372 may comprise an expandable portion. After a length of spear 380 penetrates a target, the expandable portion of first absorber end 372 may impact the target and expand (e.g., change shape, deform, etc.) to increase a contact area of electrode 350 with the target. Expansion of the expandable portion of first absorber end 372 may absorb kinetic energy of an impact of electrode 350 with a target. In other embodiments, deployment of electrode 350 may cause the expandable portion of first absorber end 372 to expand to increase the contact area of electrode 350 with the target prior to impact. An increase in contact area of electrode 350 with a target may reduce an impact pressure exerted by electrode 350 on the target. First absorber end 372 may reduce a likelihood of blunt impact and/or penetration of a body of electrode 350 with a target, thereby enabling electrode 350 to be launched from a CEW and impact a target with greater kinetic energy than an electrode without an absorber. For example, electrode 350 comprising absorber 370 may impact a target with 12 joules of energy without risk of the forward portion of electrode 350 penetrating the target, whereas an electrode without an absorber may only impact a target with 6 joules of energy without risk of the forward portion of the electrode penetrating the target.

In various embodiments, first absorber end 372 may define an expandable portion of absorber 370. For example, the expandable portion may be configured to expand upon impact with a target to increase a contact area between absorber 370 and the target and/or absorb a portion of the impact force imparted on the target by electrode 350. Prior to impact and/or launch of electrode 350, the expandable portion may be in a collapsed state. After (or during) impact and/or launch of electrode 350, the expandable portion may be forced into an expanded state. The expandable portion may comprise one or more members (e.g., fingers). For example, the expandable portion may include members extending in an axially forward direction from first absorber end 372. The members may be arranged at regularly spaced circumferential intervals, such as every 30 degrees, every 60 degrees, every 90 degrees, and/or the like. Each member may be separated from adjacent members by a channel (e.g., slot, void, etc.). A shape of a channel may comprise a V-shape, a U-shape, a C-shape, a square shape, and/or any other suitable or desired shape. For example, first absorber end 372 may comprise a plurality of channels, wherein each member of a plurality of members is separated from an adjacent member of the plurality of members by a respective channel of the plurality of channels. At least one channel of a plurality of channels may be disposed between pair of adjacent members of a plurality of members of the expandable portion. In various embodiments, the arrangement and shape of the members in combination with the arrangement and shape of the channels may generally comprise a castellated nut (i.e., castle nut, etc.) shape or a slotted inverted (e.g., reversed) frustoconical cup shape.

In response to impact and/or launch of electrode 350, the members of the expandable portion may flex (e.g., deform) radially outward. For example, as absorber 370 impacts a target, the force of the impact may cause each member to deform outward, thereby further increasing the impact area of absorber 370 over the duration of impact. For example, as electrode 350 flies toward a target, momentum of electrode 350 causes spear 380 to pierce the target. Typically, however, the momentum of electrode 350 is not exhausted by penetration of the spear. The remaining momentum of electrode 350 is transferred to the target via impact of absorber 370 with the target. Absorber 370 is configured to reduce the impact force in response to the change in momentum, thereby preventing further penetration of at least a portion of electrode 350 (e.g., forward portion, electrode body, etc.) into the target. The expandable portion of first absorber end 372 may expand (e.g., deform), thereby extending the impact time of absorber 370 with the target, which in turn reduces the impact force. As the expandable portion of first absorber end 372 expands, the impact area may increase (e.g., by members flaring radially outward), thereby distributing the force of impact over a greater area, which in turn may prevent electrode body 351 from penetrating or further impacting the target. Increasing the impact area while also extending the impact time may have a synergistic effect on reducing blunt impact and preventing penetration of tissue of a target by electrode body 351.

In various embodiments, head 360 may comprise varying dimensions from first head end 362 to second head end 363. For example, head 360 may comprise an hourglass shape wherein first head end 362 and second head end 363 each comprise a greater diameter than middle section 365. First head end 362 may comprise a first diameter, second head end 363 may comprise a second diameter, and middle section 365 may comprise a third diameter (each diameter may also be referred to as a head diameter). The first diameter and the second diameter may each be greater than the third diameter (e.g., a middle section diameter). The first diameter may be less than the second diameter. The second diameter may be greater than the first diameter and the third diameter.

As discussed further herein, head 360 may be configured to receive an attachment. The attachment may be coupled to the middle portion of the head. The attachment may comprise varying thicknesses. For example, the attachment may comprise a first thickness proximate a portion of the attachment contacting first head end 362. The attachment may comprise a second thickness proximate a portion of the attachment contacting middle section 365. The first thickness and the first diameter may be substantially similar in size to the second thickness and the middle portion diameter. The first thickness and the first diameter may be less than or substantially similar in size to the second diameter. The second thickness and the middle section diameter may be less than or substantially similar in size to the second diameter.

In various embodiments, head 360 may comprise an electrically conductive material. For example, head 360 may comprise a metal material. Head 360 may comprise a metal alloy such as, for example, brass.

In various embodiments, electrode 350 may comprise a filament 387 (e.g., a wire-tether, a wire, etc.). Filament 387 may comprise an electrically conductive material configured to electrically couple electrode 350 to a cartridge, a magazine, and/or a CEW handle. In that regard, filament 387 may be configured to provide a stimulus signal and/or an ignition signal to electrode 350 via a signal generator of a CEW handle.

Filament 387 may comprise a first filament end 388 opposite a second filament end 389. First filament end 388 may be coupled to electrode 350. In some embodiments, first filament end 388 may be coupled to head 360. For example, first filament end 388 may be welded to head 360. As a further example, first filament end 388 may be coupled between head 360 and an inner surface of electrode body 351. For example, first filament end 388 may be inserted between head 360 and electrode body 351, and electrode body 351 may be press-fit (e.g., deformed, staked, etc.) to couple electrode body 351 to head 360. The press-fit between electrode body 351 and head 360 may couple first filament end 388 between electrode body 351 and head 360.

Second filament end 389 may extend aft electrode 350 and may be configured to couple within a cartridge and/or deployment unit. In that regard, head 360, filament 387, and a cartridge may be in electrical series.

In various embodiments, filament 387 may be electrically conductive from first filament end 388 to second filament end 389. For example, filament 387 may be non-insulated from first filament end 388 to second filament end 389.

In various embodiments, filament 387 may be insulated from first filament end 388 to second filament end 389. In that respect, only a portion of first filament end 388 coupled to head 360 and/or a portion of second filament end 389 coupled to the cartridge may be non-insulated.

In various embodiments, filament 387 may be stowed in electrode body 351. For example, filament 387 may be wound in a winding (e.g., coils, filament winding, etc.). The winding may be stowed (e.g., stored, disposed, etc.) within electrode body 351. During a deployment, electrode 350 may travel in a direction forward a cartridge. During travel, filament 387 may unravel (e.g., uncoil, unwind, etc.) from the winding to deploy filament 387 aft electrode body 351.

In various embodiments, electrode 350 may comprise a rear nozzle 355. Rear nozzle 355 may be disposed within electrode body 351. Rear nozzle 355 may be disposed within electrode body 351 proximate second end 353. Rear nozzle 355 may be disposed within electrode body 351 forward second end 353. For example, second end 353 may be configured to receive a portion of a piston in response to electrode 350 being disposed within a cartridge. In various embodiments, rear nozzle 355 may be disposed forward second end 353 such that rear nozzle 355 may not contact the piston (e.g., before a deployment of electrode 350 from the cartridge). In various embodiments, rear nozzle 355 may be disposed forward second end 353 such that rear nozzle 355 abuts the piston while electrode 350 is stored within the cartridge. In that regard, rear nozzle 355 may provide a contact surface configured to receive a force from the piston during a deployment. In some embodiments, rear nozzle 355 may be axially offset from second end 353.

Rear nozzle 355 may define an opening 356. Opening 356 may be radially centered within electrode body 351. Rear nozzle 355 may be configured to position filament 387 as filament 387 unwinds and exits electrode 350. For example, as filament 387 deploys from electrode 350, filament 387 moves through opening 356. Friction between an inner wall of opening 356 and filament 387 applies a force on filament 387. Applying a force on filament 387 during a deployment provides drag on electrode 350. Providing drag on electrode 350 increases stability of flight and accuracy of flight of electrode 350 along an intended trajectory. Increasing stability of flight and/or accuracy of flight may improve the repeatability of flight along intended trajectory of electrodes launched from different cartridges.

In various embodiments, opening 356 may further define a groove 357. Groove 357 may comprise an axial groove in opening 356 extending radially inward from opening 356 towards an inner surface of electrode body 351. Groove 357 may be sized and shaped to receive filament 387.

In various embodiments, groove 357 may position filament 387 prior to a deployment. During the deployment, filament 387 may unwind and may leave groove 357 (e.g., to contact opening 356). In various embodiments, groove 357 may position filament 387 prior to and during a deployment. For example, during the deployment filament 387 may remain within groove 357.

In various embodiments, electrode 350 (e.g., electrode body 351) may comprise one or more coupling points. Each coupling point may comprise a mechanical coupling, a chemical coupling, and/or the like. For example, electrode 350 may comprise a first coupling point 305A, a second coupling point 305B, and a third coupling point 305C.

First coupling point 305A may be located proximate first end 352 of electrode body 351. First coupling point 305A may comprise a coupling of electrode body 351 to head 360. For example, first coupling point 305A may comprise a deformation (e.g., inward protrusion, press fit, staking, etc.) of electrode body 351 to couple head 360 within electrode body 351.

Second coupling point 305B may be located forward second end 353 of electrode body 351. Second coupling point 305B may be between first coupling point 305A and third coupling point 305C. Second coupling point 305B may comprise a coupling of electrode body 351 to rear nozzle 355. For example, second coupling point 305B may comprise a deformation (e.g., inward protrusion, press fit, staking, etc.) of electrode body 351 to couple rear nozzle 355 within electrode body 351.

Third coupling point 305C may be located proximate second end 353 of electrode body 351. Third coupling point 305C may be aft second coupling point 305B. Third coupling point 305C may comprise a coupling of electrode body 351 to a piston. For example, as previously discussed with reference to FIGS. 4A and 4B, electrode body 351 may be coupled to a piston prior to a deployment. Third coupling point 305C may comprise a deformation (e.g., inward protrusion, press fit, staking, etc.) of electrode body 351 to couple a piston within electrode body 351 (. Third coupling point 305C may be configured to decouple during a deployment. For example, third coupling point 305C may decouple responsive to a sufficient force (e.g., in response to a piston contacting a piston stop within the cartridge).

In various embodiments, first coupling point 305A and second coupling point 305B may remain coupled before, during, and after a deployment. Third coupling point 305C may remain coupled before the deployment, but decouple during the deployment.

In some embodiments, first coupling point 305A may decouple after a deployment. For example, before and during a deployment first coupling point 305A may remain coupled. In response to electrode 350 contacting a target after the deployment, a force of impact may cause first coupling point 305A to decouple to allow electrode body 351 to decouple from head 360. In that respect, head 360 may remain coupled to the target as electrode body 351 decouples and falls away from the target. Second coupling point 305B may remain coupled before, during, and after the deployment. Third coupling point 305C may remain coupled before the deployment, but decouple during the deployment.

In various embodiments, second head end 363 may comprise one or more features, structures, and/or the like to aid in coupling filament 387 to head 360. For example, second head end 363 may comprise one or more features, structures, and/or the like to mechanically couple first filament end 388 to head 360 and/or to ensure that first filament end 388 remains mechanically coupled to head 360 before and after deployment of electrode 350, and before, during, and after an impact of electrode 350 with a target. Second head end 363 may also comprise may comprise one or more features, structures, and/or the like to electrically couple first filament end 388 to head 360.

As previously discussed, filament 387 may be wound into a winding. In some embodiments, first filament end 388 may be wound into a winding onto second head end 363. For example, and in accordance with various embodiments, second head end 363 may comprise one or more circumferential channels. Each circumferential channel may be sized and/or shaped to receive and/or retain lengths of filament 387. In that respect, first filament end 388 may be wound circumferentially through the one or more circumferential channels of second head end 363 to couple first filament end 388 to second head end 363. In some embodiments, an end of first filament end 388 may extend forward second head end 363 and proximate middle section 365 (e.g., as depicted in FIG. 3C).

In various embodiments, first coupling point 305A may be located proximate at least one channel of the one or more circumferential channels of second head end 363. In that regard, the coupling of electrode body 351 to head 360 may also include first filament end 388. In that regard first coupling point 305A may also comprise a coupling of first filament end 388 to second head end 363. In that regard, the deformation of electrode body 351 to head 360 may also mechanically couple first filament end 388 to second head end 363. In various embodiments, the deformation of electrode body 351 may also pierce (e.g., strip, remove, break, etc.) an insulation layer of first filament end 388 to allow a non-insulated portion of first filament end 388 to contact and electrically couple to head 360.

Figure 4A:
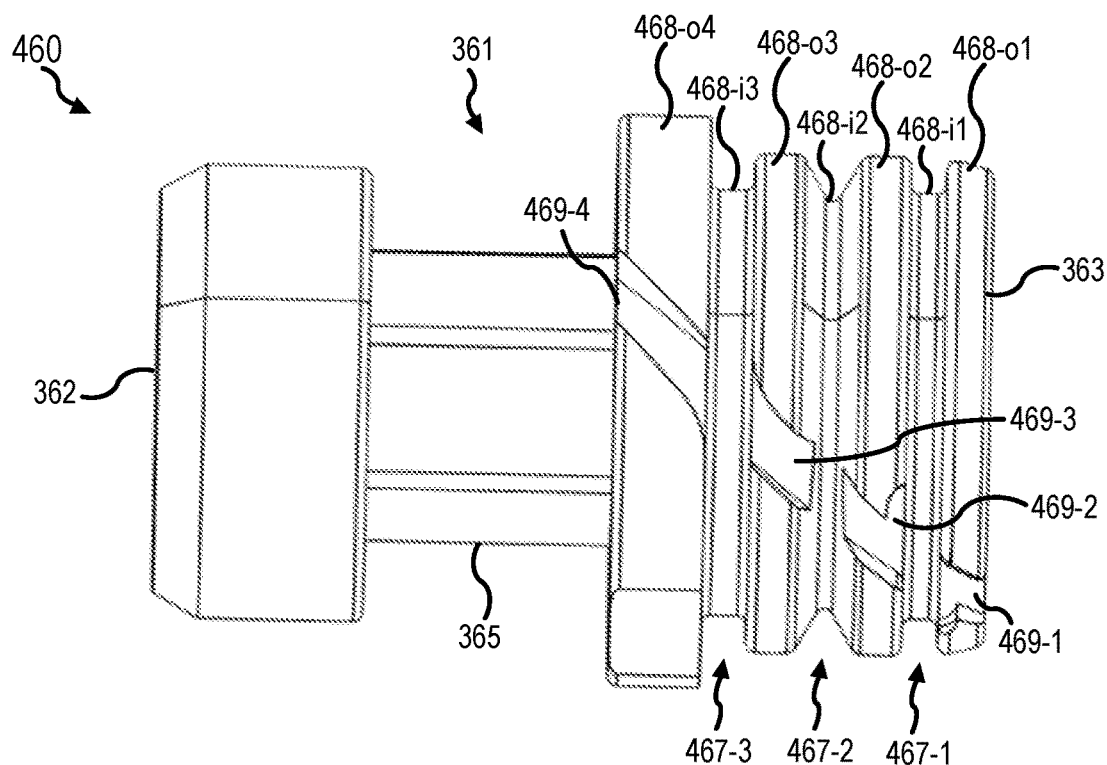
FIGS. 4A and 4B are perspective views of a head for the electrode of FIGS. 3A-3C, in accordance with various embodiments.
Figure 4B:
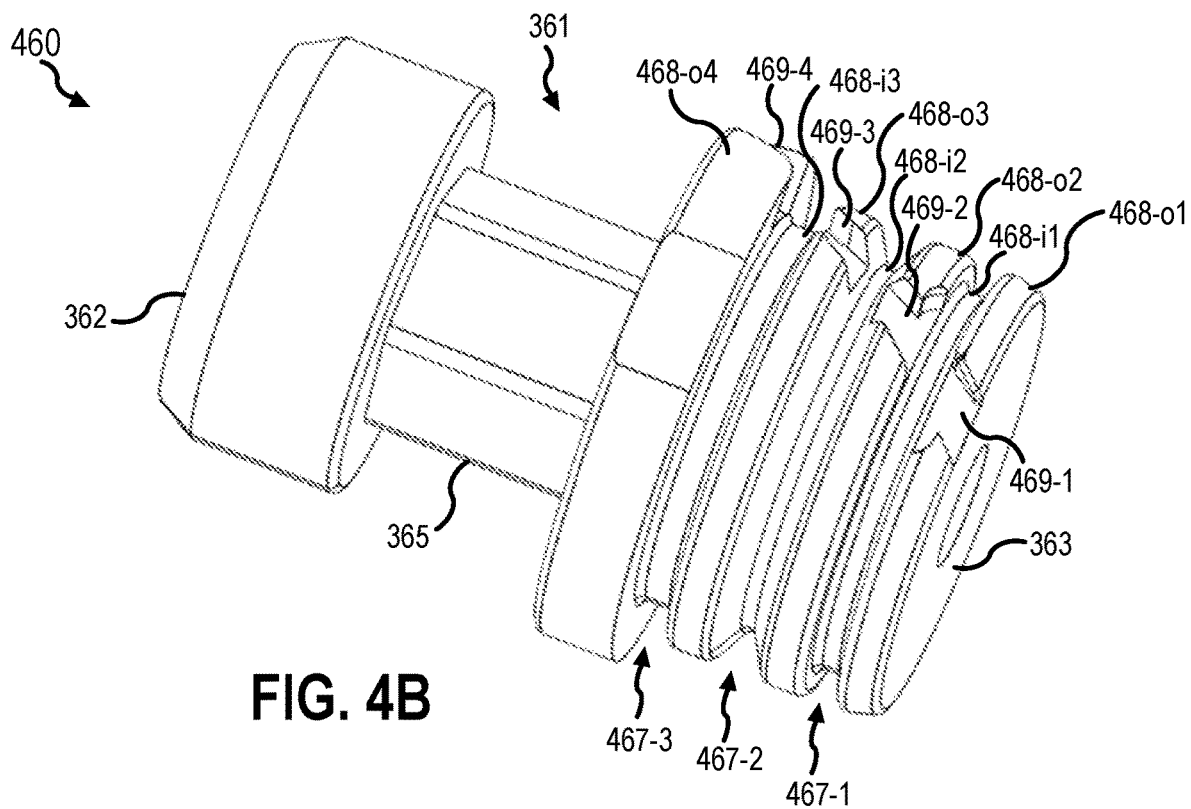

In various embodiments, and with reference to FIGS. 4A and 4B, a head 460 is depicted in greater detail. Head 460 may be similar to, and share similar features and components as, head 360, with brief reference to FIGS. 3A-3C. For example, head 460 may comprise a head body 361 having a first head end 362 opposite a second head end 363. Head body 361 may define a middle section 365 between first head end 362 and second head end 363.

In various embodiments, second head end 363 may define one or more circumferential channels. For example, second head end 363 may define a first channel 467-1, a second channel 467-2, a third channel 467-3, and/or the like. As referred to herein, channels 467-1, 467-2, 467-3 may be referred to individually as a "channel 467" or collectively as "channels 467." Each channel 467 may be sized and/or shaped to receive one or more lengths of filament, as previously discussed herein. Each channel 467 may comprise any suitable or desired shape, such as a U-shape, a V-shape, a C-shape, a square shape, and/or the like. Each channel 467 may define circumferential channels through second head end 363.

In various embodiments, each channel 467 may be defined by a radially inward surface separated axially and defined by two radially outward surfaces. For example, second head end 363 may define one or more radially inward surfaces, such as a first radially inward surface 468-$i$1, a second radially inward surface 468-$i$2, and a third radially inward surface 468-$i$3. As referred to herein, radially inward surfaces 468-$i$1, 468-$i$2, 468-$i$3 may be referred to individually as a "radially inward surface 468-$i$" or collectively as "radially inward surfaces 468-$i$." Second head end 363 may define one or more radially outward surfaces, such as a first radially outward surface 468-$o$1, a second radially outward surface 468-$o$2, a third radially outward surface 468-$o$3, and a fourth radially outward surface 468-$o$4. As referred to herein, radially outward surfaces 468-$o$1, 468-$o$2, 468-$o$3, 468-$o$4 may be referred to individually as a "radially outward surface 468-$o$" or collectively as "radially outward surfaces 468-$o$." Each radially outward surface 468-$o$ may be radially outward from each radially inward surface 468-$i$. Each radially inward surface 469-$i$ may be radially inward from each radially outward surface 468-$o$.

First channel 467-1 may be defined by first radially outward surface 468-$o$1, first radially inward surface 468-$i$1, and second radially outward surface 468-$o$2. Second channel 467-2 may be defined by second radially outward surface 468-$o$2, second radially inward surface 468-$i$2, and third radially outward surface 468-$o$3. Third channel may be defined by third radially outward surface 468-$o$3, third radially inward surface 468-$i$3, and fourth radially outward surface 468-$o$4.

In various embodiments, second head end 363 may define one or more interconnecting grooves. For example, second head end 363 may define a first interconnecting groove 469-1, a second interconnecting groove 469-2, a third interconnecting groove 469-3, and/or a fourth interconnecting groove 469-4. As referred to herein, interconnecting grooves 469-1, 469-2, 469-3, 469-4 may be referred to individually as an "interconnecting groove 469" or collectively as "interconnecting grooves 469." Each interconnecting groove 469 may be in fluid communication with one or more circumferential channels 467. Each interconnecting groove 469 may be defined as an axial groove on a respective radially outward surface 468-$o$. Each interconnecting groove 469 may be configured to receive and/or retain a length of filament. In that regard, each interconnecting groove may allow filament to be wound circumferentially and sequentially through each circumferential channel 467 by allowing the filament to be moved and wound into the next circumferential channel.

First interconnecting groove 469-1 may be defined on first radially outward surface 468-$o$1. First interconnecting groove 469-1 may be in fluid communication with first channel 467-1. First interconnecting groove 469-1 may be configured to allow filament to be wound in first channel 467-1 and into an electrode body, as previously discussed.

Second interconnecting groove 469-2 may be defined on second radially outward surface 468-$o$2. Second interconnecting groove 469-2 may be in fluid communication with first channel 467-1 and second channel 467-2. Second interconnecting groove 469-2 may be configured to allow filament to be wound in second channel 467-2 and into first channel 467-1.

Third interconnecting groove 469-3 may be defined on third radially outward surface 468-$o$3. Third interconnecting groove 469-3 may be in fluid communication with second channel 467-2 and third channel 467-3. Third interconnecting groove 469-3 may be configured to allow filament to be wound in (or to pass through) third channel 467-3 and into second channel 467-2.

Fourth interconnecting groove 469-4 may be defined on fourth radially outward surface 468-$o$4. Fourth interconnecting groove 469-4 may be in fluid communication with third channel 467-3. Fourth interconnecting groove 469-4 may be configured to allow filament to pass between an area proximate middle section 365 into third channel 467-3. In some embodiments, fourth interconnecting groove 469-4 may be configured to retain an end of the filament (e.g., as depicted in FIG. 3C).

Figure 5A:
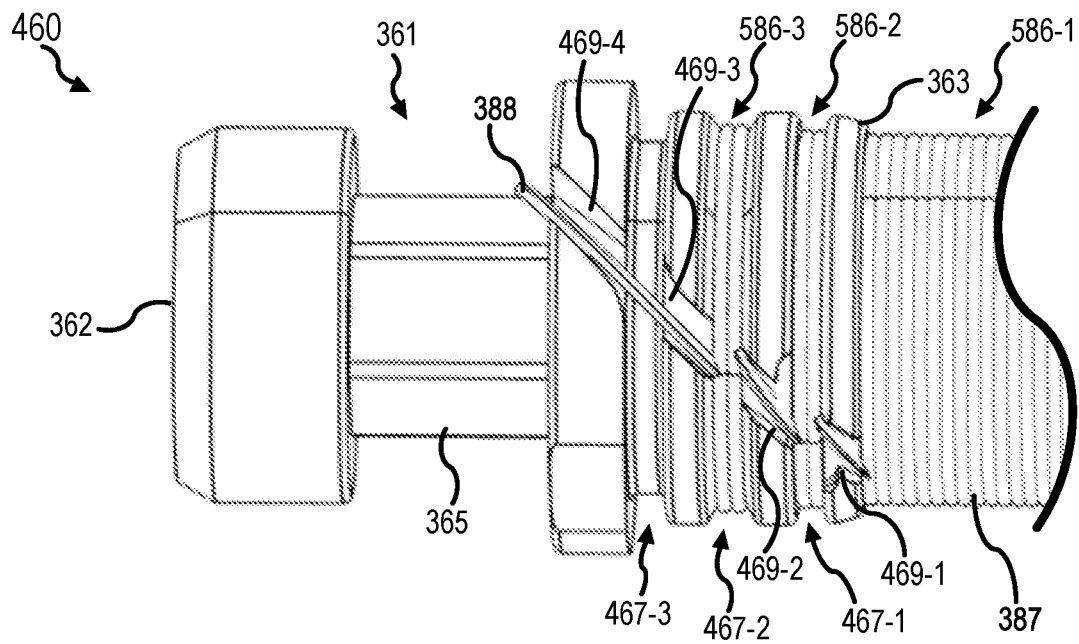
FIGS. 5A and 5B are perspective views of a head with a filament winding for the electrode of FIGS. 3A-3C, in accordance with various embodiments.
Figure 5B:
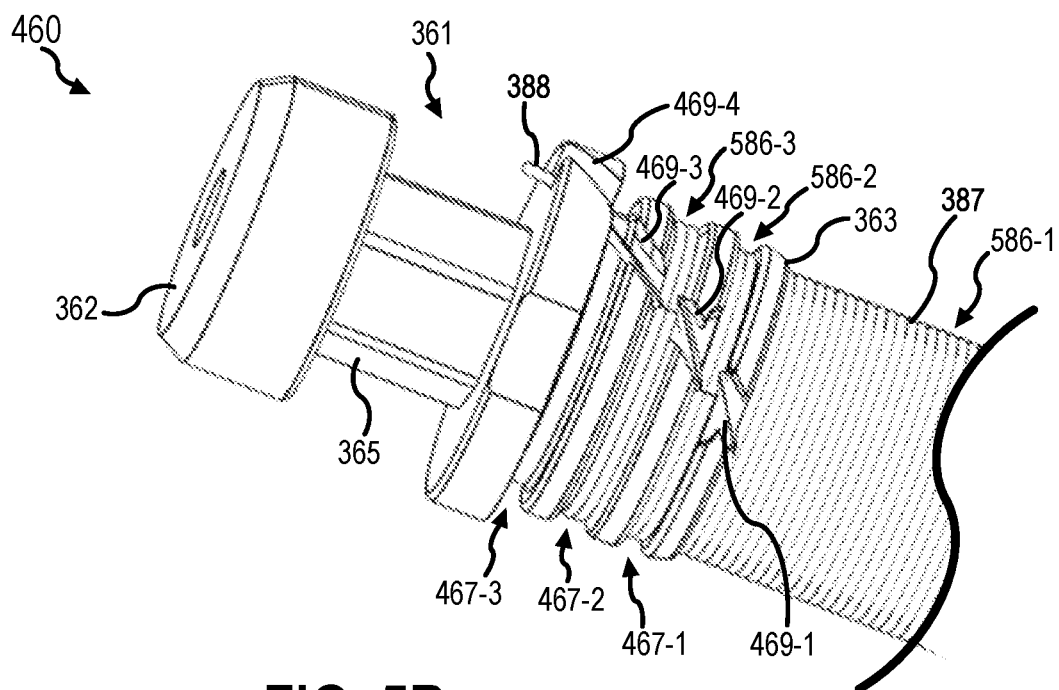

In various embodiments, and with reference to FIGS. 5A and 5B, head 460 is depicted with filament 387 wound into one or more channels 467 of head 460. Head 460 is described above, with brief reference to FIGS. 4A and 4B.

As previously discussed, filament 387 may be wound into a winding. Filament 387 is depicted wound into a winding aft of second head end 363, as previously discussed herein and depicted in FIG. 3C. First filament end 388 may also be wound into a winding onto second head end 363. For example, and in accordance with various embodiments, first filament end 388 may be wound circumferentially through the one or more circumferential channels 467 of second head end 363 to couple first filament end 388 to second head end 363. In some embodiments, an end of first filament end 388 may extend forward second head end 363 and proximate middle section 365 (e.g., as depicted in FIGS. 5A and 5B).

In various embodiments, a winding of filament 367 may comprise a plurality of different (e.g., separate, physically distinct, etc.) winding sections. For example, a winding of filament 367 may comprise a first winding portion aft of head 460 and a second winding portion wound around and coupled to head 460. As a further example, a winding of filament 367 may comprise a first winding portion aft of head 460 and a plurality of second winding portions wound around and coupled to head 460. In some embodiments, one or more winding portions of the winding of filament 367 may be separated by a physical structure of head 460, such as one or more radially outward surface (e.g., as described with reference to FIGS. 4A and 4B). One or more winding portions may comprise one or more lengths of filament 367. In some embodiments, one or more winding portions may comprise one or more circumferentially disposed lengths of filament 367. In some embodiments, one or more winding portions may comprise one or more axially disposed and/or radially disposed lengths of filament 367. For example, a portion of a winding of filament 367 disposed aft of head 460 may comprise lengths of filament 367 disposed circumferentially and adjacent radially and/or axially to one or more other lengths of filament 367.

In various embodiments, a winding of filament 367 may comprise a plurality of different winding sections including a body winding 586-1 (e.g., a body winding section, a first winding section, etc.), a first head winding 586-2 (e.g., a second winding section, a first head winding section, etc.), and/or a second head winding 586-3 (e.g., a third winding section, a second head winding section, etc.).

Body winding 586-1 may comprise a section of filament 367 wound into a winding aft of head 460. Body winding 586-1 may define a largest portion of filament 367 wound into a winding. Body winding 586-1 may comprise lengths of filament 367 disposed circumferentially and adjacent radially and/or axially to one or more other lengths of filament 367 (e.g., to form successive radial layers of filament 367 dispersed axially forward to aft and/or aft to forward).

First head winding 586-2 may comprise a section (e.g., a first section) of filament 367 wound into a winding on head 460. For example, first head winding 586-2 may be disposed within first channel 467-1. First head winding 586-2 may comprise one or more circumferentially disposed lengths of filament 367. First head winding 586-2 may be separated from body winding 586-1 by a radially outward portion of second head end 363 (e.g., first radially outward surface 468-o1, with brief reference to FIGS. 4A and 4B). First head winding 586-2 may be separated from second head winding 586-3 by a radially outward portion of second head end 363 (e.g., second radially outward surface 468-o2, with brief reference to FIGS. 4A and 4B). As depicted in FIGS. 3C, 5A, and 5B, two lengths of filament 387 are wound into first channel 467-1 (e.g., first head winding 586-1). In other embodiments, any number of lengths of filament 387 may be wound into first channel 467-1 (e.g., no length, one length, three lengths, five lengths, etc.).

In some embodiments, first head winding 586-2 may be configured to provide strain relief to filament 367, and the coupling to head 460, during a deployment of the electrode. For example, the deployment and associated high acceleration forces on the electrode may cause stress and tension on filament 367 and the coupling of first filament end 388 on to head 460. First head winding 586-2 into first channel 467-1 may at least partially relieve filament 367 of the stress and tension that could cause first filament end 388 to decouple (e.g., unwind from) head 460. For example, the tension and/or stress caused by a deployment may be applied to first head winding 586-2 instead of directly to the portion of first filament end 388 coupled to head 460 (e.g., second head winding 586-3).

Second head winding 586-3 may comprise a section of filament 367 wound into a winding on head 460. For example, second head winding 586-3 may be disposed within second channel 467-2. Second head winding 586-3 may comprise one or more circumferentially disposed lengths of filament 367. Second head winding 586-3 may be separated from first head winding 586-2 by a radially outward portion of second head end 363 (e.g., second radially outward surface 468-o2, with brief reference to FIGS. 4A and 4B). As depicted in FIGS. 3C, 5A, and 5B, three lengths of filament 387 are wound into second channel 467-2 (e.g., second head winding 586-2). In other embodiments, any number of lengths of filament 387 may be wound into second channel 467-2 (e.g., one length, two lengths, five lengths, etc.).

In some embodiments, second head winding 586-3 may be configured to position filament 367 to mechanically and/or electrically couple to head 460. For example, as previously discussed with reference to FIGS. 3A-3C, a first coupling point on an electrode may include a deformation (e.g., a deformed surface) of an electrode body into second channel 467-2. As second head winding 586-3 is positioned in second channel 467-2, the deformation of the electrode body may cause second head winding 586-3 to electrically and/or mechanically coupled to head 460 at second channel 467-2. For example, the deformation of the electrode body may contact one or more filament windings of second head winding 586-3. The deformation of the electrode body may force and mechanically couple second head winding 586-3 to second channel 467. The deformation of the electrode body may also expose (e.g., pierce, strip, remove, break, etc.) an insulation layer of filament in second head winding 586-3 to cause a non-insulated portion of filament 367 to contact and electrically couple to second channel 467-2. In that regard, the deformed surface may contact filament of second head winding 586-3 to expose a conductive material of the filament against a surface (e.g., conductive surface) of second channel 467-2.

In some embodiments, a winding of filament 367 may also comprise a third head winding comprising a section of filament 367 wound into a winding on head 460. For example, the third head winding may be disposed within third channel 467-3. The third head winding may comprise one or more circumferentially disposed lengths of filament 367. The third head winding may be separated from second head winding 586-2 by a radially outward portion of second head end 363 (e.g., third radially outward surface 468-o3, with brief reference to FIGS. 4A and 4B). The third head winding may be separated from a portion of first filament end 388 protruding forward second head end 363 by a radially outward portion of second head end 363 (e.g., fourth radially outward surface 468-o4, with brief reference to FIGS. 4A and 4B). As depicted in FIGS. 3C, 5A, and 5B, no lengths of filament 387 are wound into third channel 467-3 (e.g., a third head winding). In other embodiments, any number of lengths of filament 387 may be wound into third channel 467-3 (e.g., one length, two lengths, three lengths, etc.).

In various embodiments, during a filament winding process (e.g., a forward to aft winding process), first filament end 388 may be positioned in fourth interconnecting groove 469-4 such that an end of first filament end 388 extends forward from fourth interconnecting groove 469-4 (e.g., towards first head end 362). Filament 387 may be positioned through third channel 467-3 and third interconnecting groove 469-3 and into second channel 467-2. Filament 387 may be circumferentially wound into second channel 467-2 to form second head winding 586-3. Filament 387 may be positioned through second interconnecting groove 469-2 and into first channel 467-1. Filament 387 may be circumferentially wound into first channel 467-1 to form first head winding 586-2. Filament 387 may be positioned through first interconnecting groove 469-1 and extended aft second head end 363. Filament 387 may be wound into a winding to form body winding 586-1.

In various embodiments, during a filament winding process (e.g., an aft to forward winding process), second filament end 389 may be wound into a winding to form body winding 586-1. Filament 387 may be positioned through first interconnecting groove 469-1 and into first channel 467-1. Filament 387 may be circumferentially wound into first channel 467-1 to form first head winding 586-2. Filament 387 may be positioned through second interconnecting groove 469-2 and into second channel 467-2. Filament 387 may be circumferentially wound into second channel 467-2 to form second head winding 586-3. Filament 387 may be positioned through third interconnecting groove 469-3 and third channel 467-3 and into fourth interconnecting groove 469-4. First filament end 388 may be positioned in fourth interconnecting groove 469-4 such that an end of first filament end 388 extends forward from fourth interconnecting groove 469-4 (e.g., towards first head end 362).

Figure 6A:
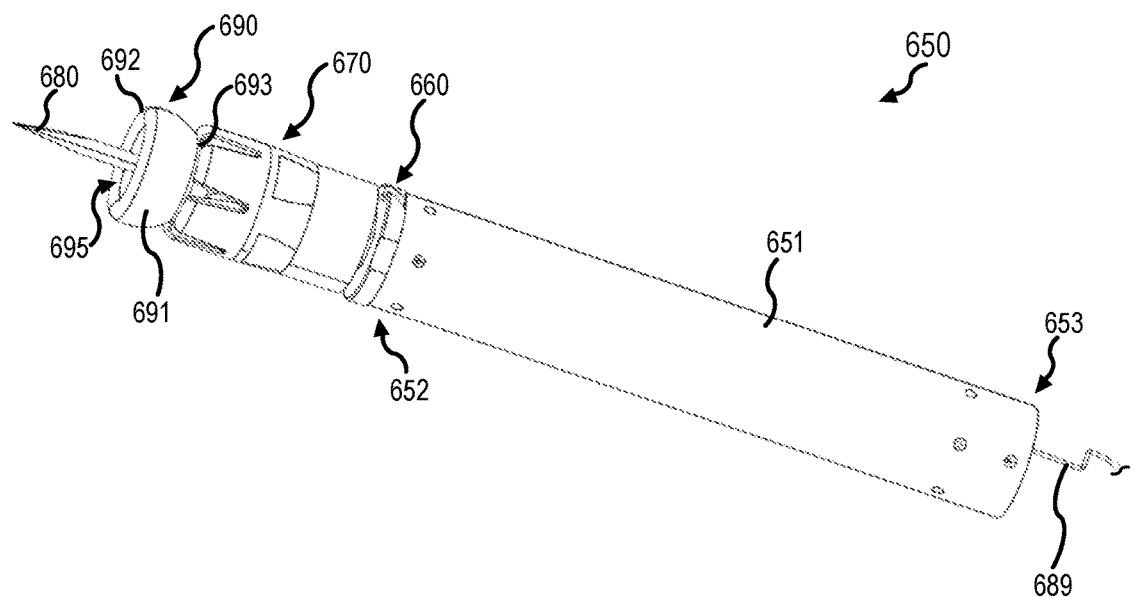
FIGS. 6A and 6B are perspective and cross-sectional views of an electrode with an impact spreader, in accordance with various embodiments.
Figure 6B:
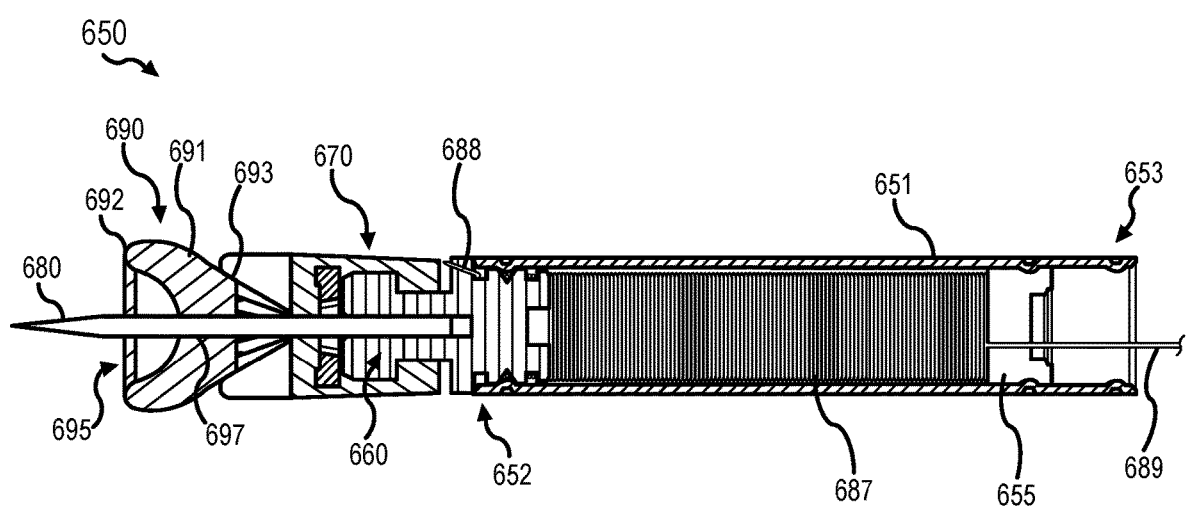

In various embodiments, and with reference to FIGS. 6A and 6B, an electrode 650 is disclosed. Electrode 650 may be similar to, and share similar features and components as, any other electrode disclosed herein. For example, electrode 650 may be similar to electrode 350, with brief reference to FIGS. 3A-3C. Electrode 650 may comprise an electrode body 651 having a first end 652 opposite a second end 653. Electrode body 651 may be similar to any other electrode body disclosed herein.

Electrode 650 may comprise a head 660. Head 660 may be similar to any other head, front head, electrode head, or the like disclosed herein. Head 660 may comprise a body having a first head end opposite a second head end. The second head end may be coupled to electrode body 651. The first head end may be configured to couple to and/or receive one or more attachments. For example, the first head end may be configured to receive and/or couple to spear 680. Spear 680 may be similar to any other spear disclosed herein.

Electrode 650 may comprise a filament 687. Filament 687 may be similar to any other filament disclosed herein. Filament 687 may comprise an electrically conductive material configured to electrically couple electrode 650 to a cartridge, a magazine, and/or a CEW handle. Filament 687 may comprise a first filament end 688 opposite a second filament end 689. First filament end 688 may be coupled to electrode 650, such as to head 660. Second filament end 689 may extend aft electrode 650 and may be configured to couple within a cartridge and/or deployment unit. In that regard, head 660, filament 687, and a cartridge may be in electrical series.

Electrode 650 may comprise a rear nozzle 655. Rear nozzle 655 may be similar to any other rear nozzle disclosed herein. Rear nozzle 655 may be disposed within electrode body 651 proximate second end 653.

In various embodiments, electrode 650 may comprise an absorber 670. Absorber 670 may be similar to any other absorber disclosed herein. Absorber 670 may be coupled to head 660. Absorber 670 may comprise an absorber body having a first absorber end opposite a second absorber end. Absorber 670 may be coupled to head 660. Absorber 670 may extend forward head 660. Absorber 670 may be coupled to or may define an opening for spear 680.

As previously discussed herein, absorber 670 may be configured to at least partially absorb (or receive) a force of impact with a target. For example, the first absorber end of absorber 670 may comprise an expandable portion configured to expand (e.g., change shape, deform, etc.) upon impact to increase a contact area of electrode 650 (and absorber 670) with the target. Prior to impact, the expandable portion may be in a collapsed state. After (or during) impact, the expandable portion may be forced into an expanded state.

The expandable portion may comprise one or more members (e.g., fingers). The members of the expandable portion of absorber 670 may be similar to the members of the expandable portion of any other absorber disclosed herein. In response to impact of electrode 650 (and absorber 670), the members of the expandable portion may flex (e.g., deform) radially outward. For example, as absorber 670 impacts a target, the force of the impact may cause each member to deform outward, thereby further increasing the impact area of absorber 670 over the duration of impact.

In various embodiments, increasing the deformation of the members of the expandable portion (e.g., increasing the radially outward deformation or one or more members) may increase the impact area of absorber 670. Increasing the impact area of absorber 670 may increase the amount of force that absorber 670 can receive during an impact.

In that regard, and in accordance with various embodiments, electrode 650 may comprise an impact spreader 690. Impact spreader 690 may be configured to at least partially aid in increasing the radially outward deformation of the expandable portion of absorber 670. Impact spreader 690 may be positioned forward absorber 670. In some embodiments, impact spreader 690 may be positioned aft a front end of spear 680. Impact spreader 690 may be coupled to spear 680. Impact spreader 690 may be coupled to a first absorber end of absorber 670.

Impact spreader 690 may comprise a spreader body 691 having a first spreader end 692 opposite a second spreader end 693. First spreader end 692 may be proximate a front end of spear 680. Second spreader end 693 may be proximate to, or coupled to or in contact with, a first absorber end of absorber 670. Second spreader end 693 may be positioned within an opening of the first absorber end of absorber 670. For example, at least a portion of second spreader end 693 may be inserted into the first absorber end of absorber 670.

Impact spreader 690 may be configured to receive an impact force and distribute the impact force to absorber 670. For example, responsive to impact of electrode 650 against a target, impact spreader 690 may receive an impact force. Impact spreader 690 may translate in an axially aft direction to transfer and distribute the impact force to absorber 670.

Impact spreader 690 may be configured to provide an axial force against absorber 670 responsive to an impact against impact spreader 690. For example, in response to electrode 650 being deployed toward a target, spear 680 and impact spreader 690 may impact the target. In that regard, first spreader end 692 may impact the target. The impact against first spreader end 692 may cause impact spreader 690 to move in an aft direction towards absorber 670. Movement in the aft direction may cause second spreader end 693 to provide the axial force against the first absorber end of absorber 670. The axial force provided by impact spreader 690 may be received by the expandable portion of absorber 670. Receipt of the axial force may cause the one or more members of the expandable portion to deform radially outward. In some embodiments, the axial force provided by impact spreader 690 may cause the one or more members of the expandable portion to further deform radially outward compared to absorber 670 receiving the impact force without use of impact spreader 690.

In some embodiments, impact spreader 690 may be configured to remain in contact with absorber 670 before, during, and after impact of electrode 650 against the target. In some embodiments, impact spreader 690 may not be in contact with absorber 670 before impact of electrode 650 against the target, but may contact and remain in contact with absorber 670 during and after impact of electrode 650 against the target. In some embodiments, impact spreader 690 may be configured to break during impact of electrode 650 against the target. In that regard, impact spreader 690 may apply the force against absorber 670 responsive to impact of electrode 650 against the target, but then may break (e.g., decouple, disengage, etc.) such that absorber 670 contacts the target after the initial impact of electrode 650 against the target.

Spreader body 691 may comprise any suitable size, shape, and/or dimensions capable of aiding in the deformation of the expandable portion of absorber 670 during an impact. In some embodiments, spreader body 691 may comprise a diameter (e.g., width) greater than or equal to a diameter of absorber 670. In some embodiments, spreader body 691 may comprise a diameter less than or equal to a diameter of absorber 670. In some embodiments, spreader body 681 may comprise a varying diameter such that a first diameter of a first location of spreader body 681 is greater than or equal to a diameter of absorber 670 and a second diameter of a second location of spreader body 681 is less than or equal to the diameter of absorber 670. Spreader body 691 may comprise a length less than a length of spear 680. A length of spreader body 691 together with a length of absorber 670 may be less than a length of spear 680. Spreader body 691 may comprise any suitable material configured to receive an impact force and/or to aid in the deformation of the expandable portion of absorber 670 during the impact. For example, spreader body 691 may comprise a rubber material. In some embodiments, spreader body 691 may comprise a same material as absorber 670. In some embodiments, spreader body 691 may comprise a different material from absorber 670.

In various embodiments, spreader 690 may comprise any suitable shape capable of aiding in the deformation of the expandable portion of absorber 670 during an impact. For example, spreader 690 may comprise a convex shape, a concave shape, a conical shape, a spherical shape, a square shape, a rectangular shape, a torus shape, a ring shape, and/or the like.

As depicted in FIGS. 6A and 6B, spreader 690 may comprise a concave shape wherein a diameter of first spreader end 692 is greater than a diameter of second spreader end 693. Second spreader end 693 may comprise a diameter less than a diameter of absorber 670 such that second spreader end 693 may be at least partially received within the first absorber end of absorber 670. First spreader end 692 may define an opening 695. First spreader end 692 and second spreader end 693 may define a channel 697 through spreader body 691. Channel 697 may be sized and shaped to receive spear 680. Channel 697 may be in fluid communication with opening 695.

Figure 7:
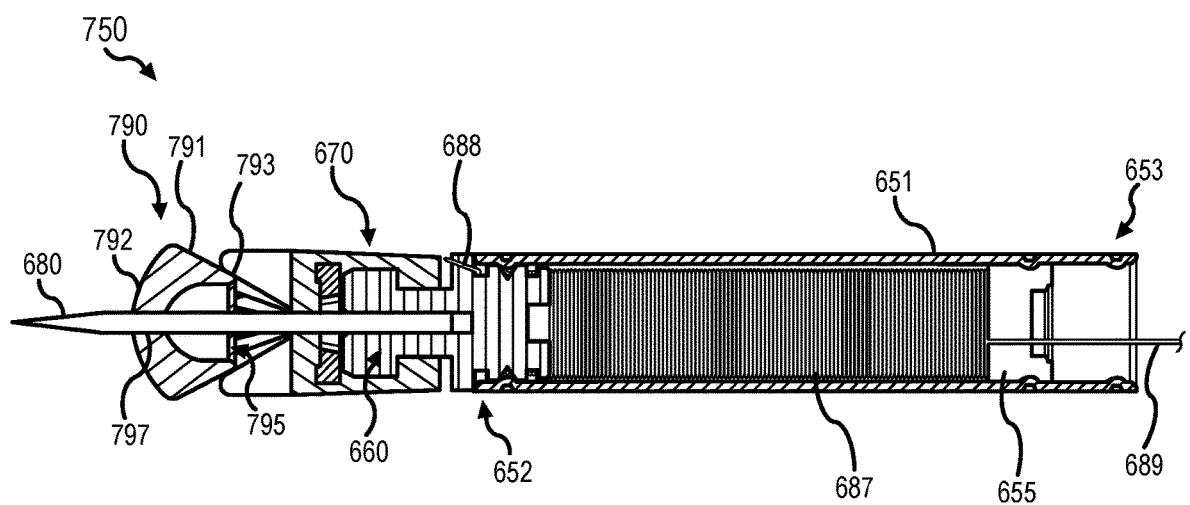
FIG. 7 is a cross-sectional view of an electrode with an impact spreader, in accordance with various embodiments.

In various embodiments, and with reference to FIG. 7, an electrode 750 with a spreader 790 is disclosed. Electrode 750 may be similar to any other electrode disclosed herein. Spreader 790 may be similar to spreader 690, with brief reference to FIGS. 6A and 6B. Spreader 790 may comprise a spreader body 791 having a first spreader end 792 opposite a second spreader end 793. As depicted in FIG. 7, spreader 790 may comprise a convex shape wherein a diameter of first spreader end 792 is greater than a diameter of second spreader end 793. First spreader end 792 may comprise a curved surface relative to a flat surface of the first spreader end of spreader 690 discussed in FIGS. 6A and 6B. Second spreader end 793 may comprise a diameter less than a diameter of absorber 670 such that second spreader end 793 may be at least partially received within the first absorber end of absorber 770. Second spreader end 793 may define an opening 795. First spreader end 792 and second spreader end 793 may define a channel 797 through spreader body 791. Channel 797 may be sized and shaped to receive spear 680. Channel 797 may be in fluid communication with opening 795.

In various embodiments, an electrode for a conducted electrical weapon is disclosed. The electrode may comprise an electrode body and an electrode head. The electrode body may comprise a first body end opposite a second body end. The electrode head may comprise a first head end opposite a second head end, and the second head end may be coupled to the first body end of the electrode body. The electrode head may comprise an axial channel defined at the first head end. The electrode head may comprise a circumferential channel defined proximate the second head end.

In various embodiments of the above electrode, the circumferential channel may be obstructed by the first body end of the electrode body. In various embodiments of the above electrode, the circumferential channel may be aft the axial channel. In various embodiments of the above electrode, the circumferential channel may comprise a plurality of circumferential channels axially dispersed proximate the second head end. In various embodiments of the above electrode, the circumferential channel may comprise a U-shape, a V-shape, a C-shape, or a square shape. In various embodiments of the above electrode, the electrode may comprise a filament having a first filament end opposite a second filament end, and the first filament end may be coupled to the circumferential channel of the electrode head. The first filament end may be circumferentially wound into the circumferential channel of the electrode head. The first body end of the electrode body may comprise a coupling point proximate the circumferential channel of the electrode head, and the coupling point may comprise a deformed surface protruding radially inward towards the circumferential channel of the electrode head. The deformed surface may contact the first filament end of the filament to expose a conductive material of the filament against the circumferential channel of the electrode head.

In various embodiments, a front head for a projectile is disclosed. The front head may comprise a head body comprising a first head end opposite a second head end; an axial channel defined at the first head end; a first circumferential channel defined on the head body proximate the second head end; and a second circumferential channel defined on the head body forward the first circumferential channel.

In various embodiments of the above front head, the front head may comprise an interconnecting groove defined on the head body, and the interconnecting groove may be in fluid communication with at least one of the first circumferential channel or the second circumferential channel. In various embodiments of the above front head, the first circumferential channel may comprise a first radially inward surface defined by a first radially outward surface and a second radially outward surface. The front head may further comprise a first interconnecting groove defined on the first radially outward surface, and the first interconnecting groove may be in fluid communication with the first circumferential channel. In various embodiments of the above front head, the second circumferential channel may comprise a second radially inward surface defined by the second radially outward surface and a third radially outward surface. The front head may further comprise: a first interconnecting groove defined on the first radially outward surface, and the first interconnecting groove is in fluid communication with the first circumferential channel; and a second interconnecting groove defined on the second radially outward surface, and the second interconnecting groove is in fluid communication with the first circumferential channel and the second circumferential channel. The front head may further comprise a third interconnecting groove defined on the third radially outward surface, and the third interconnecting groove is in fluid communication with the second circumferential channel. In various embodiments of the above front head, the first circumferential channel may comprise a first shape and the second circumferential channel comprises a second shape, and the first shape is different from the second shape.

In various embodiments, an electrode for a conducted electrical weapon is disclosed. The electrode may comprise an electrode body and an electrode head. The electrode body may comprise a first body end opposite a second body end. The electrode head may comprise a first head end opposite a second head end, and the second head end may be coupled to the first body end of the electrode body. The electrode head may comprise a first circumferential channel defined proximate the second head end. The electrode head may comprise a second circumferential channel defined forward the first circumferential channel.

In various embodiments of the above electrode, the second head end may be coupled to the first body end of the electrode body proximate the second circumferentially channel. In various embodiments of the above electrode, the electrode body may comprise an opening through the first body end, and the opening may be in fluid communication with the first circumferential channel and the second circumferential channel.

In various embodiments, an electrode for a conducted electrical weapon is disclosed. The electrode may comprise an electrode body, an electrode head, and a filament. The electrode body may comprise a first body end opposite a second body end. The electrode head may comprise a first head end opposite a second head end, and the second head end may be coupled to the first body end of the electrode body. The filament may comprise a first filament end opposite a second filament end, and the first filament end may be circumferentially wound onto the electrode head proximate the second head end.

In various embodiments of the above electrode, the first filament end may be circumferentially wound onto the electrode head to mechanically and electrically couple the filament to the electrode head. In various embodiments of the above electrode, the filament may be stowed within the electrode body. The filament may be wound into a winding, and the winding may be stowed within the electrode body. In various embodiments of the above electrode, the first filament end of the filament may be circumferentially wound on to the electrode head at and aft the coupling of the first body end to the second head end.

In various embodiments of the above electrode, the first filament end of the filament may be circumferentially wound on to the electrode head proximate the coupling of the first body end to the second head end. The coupling of the first body end to the second head end may comprise a deformed surface protruding radially inward towards the electrode head, and the deformed surface may contact the first filament end of the filament to expose a conductive material of the filament against the electrode head. The first filament end of the filament may extend forward the coupling of the first body end to the second head end.

In various embodiments, a filament winding for an electrode of a conducted electrical weapon is disclosed. The filament winding may comprise a body winding section, a first head winding section, and a second head winding section. The body winding section of the filament winding may be stowed within a body of the electrode. The first head winding section of the filament winding may be circumferentially wound onto a head of the electrode, and the first head winding section may be forward the body winding section. The second head winding section of the filament winding may be circumferentially wound onto the head of the electrode, and the second head winding section may be forward the first head winding section.

In various embodiments of the above filament winding, the first head winding section and the second head winding section may be separated from the body winding section by a surface of the head of the electrode. In various embodiments of the above filament winding, the first head winding section may be separated from the second head winding section by a surface of the head of the electrode. In various embodiments of the above filament winding, the first head winding section and the second head winding section may be separated from the body winding section by a first surface of the head of the electrode, and the first head winding section may be separated from the second head winding section by a second surface of the head of the electrode. In various embodiments of the above filament winding, the body winding section may comprise a larger portion of the filament winding than the first head winding section and the second head winding section. In various embodiments of the above filament winding, the first head winding section may be configured to provide a strain relief to the filament winding. In various embodiments of the above filament winding, the second head winding section may be configured to at least one of mechanically or electrically couple the filament winding to the head of the electrode. In various embodiments of the above filament winding, the second head winding section may comprise a non-insulated portion of the filament winding configured to electrically couple to the head of the electrode.

In various embodiments, an electrode for a conducted electrical weapon is disclosed. The electrode may comprise an electrode body, an electrode head, and a filament. The electrode body may comprise a first body end opposite a second body end. The electrode head may comprise a first head end opposite a second head end, and the second head end may be coupled to the first body end of the electrode body. The electrode head may comprise a circumferential channel defined proximate the second head end. The filament may comprise a first filament end opposite a second filament end, and the first filament end may be wound into the circumferential channel of the electrode head.

In various embodiments of the above electrode, the circumferential channel may comprise a plurality of circumferential channels. The first filament end may be wound into at least two circumferential channels of the plurality of circumferential channels. In various embodiments of the above electrode, the first filament end may be at least one of mechanically or electrically coupled to the electrode head by the circumferential channel.

In various embodiments, an electrode for a conducted electrical weapon is disclosed. The electrode may comprise an electrode body, an electrode head, and an absorber. The electrode body may comprise a first body end opposite a second body end. The electrode head may comprise a first head end opposite a second head end, and the second head end may be coupled to the first body end of the electrode body. The absorber may be coupled to the electrode head, the absorber may comprise a first material defining an outer portion of the absorber and a second material defining an inner portion of the absorber, and the first material may be different from the second material.

In various embodiments of the above electrode, the first material may comprise a deformable material. In various embodiments of the above electrode, the second material may comprise a rigid material. In various embodiments of the above electrode, the first material and the second material may each comprise electrically non-conductive material. In various embodiments of the above electrode, the inner portion of the absorber may contact the first head end of the electrode head. In various embodiments of the above electrode, the absorber may comprise a channel defined through the outer portion and the inner portion of the absorber. In various embodiments of the above electrode, the absorber may be coupled to the first head end of the electrode head. In various embodiments of the above electrode, the absorber may be coupled to the electrode head at a middle section between the first head end and the second head end of the electrode head. The inner portion of the absorber may be forward the middle section of the electrode head.

In various embodiments, an absorber pad for an electrode of a conducted electrical weapon is disclosed. The absorber pad may comprise an absorber body and a core. The absorber body may comprise a first absorber end opposite a second absorber end, and the absorber body may comprise a first material. The core may be disposed within the absorber body, the core may comprise a second material, and the first material may be different from the second material.

In various embodiments of the above absorber pad, the core may define an inner portion of the absorber body. In various embodiments of the above absorber pad, the core may be at least partially enclosed by the absorber body. In various embodiments of the above absorber pad, the core may be fully enclosed by the absorber body. In various embodiments of the above absorber pad, the first material may comprise a deformable material, and the second material may comprise a rigid material. In various embodiments of the above absorber pad, the core may comprise a ring shape. In various embodiments of the above absorber pad, the core may comprise an arm extending in an axially forward direction towards the first absorber end. In various embodiments of the above absorber pad, the core may comprise a plurality of arms defined at radial edges of the core, and the plurality of arms may extend in an axially forward direction towards the first absorber end.

In various embodiments, an electrode for a conducted electrical weapon is disclosed. The electrode may comprise an electrode body, an electrode head, and an absorber. The electrode body may comprise a first body end opposite a second body end. The electrode head may comprise a first head end opposite a second head end, and the second head end may be coupled to the first body end of the electrode body. The absorber may be coupled to the electrode head. The absorber may comprise an absorber body and a core. The absorber body may comprise a first absorber end opposite a second absorber end. The core may be disposed within the absorber body, the core may be positioned proximate the electrode head, and the core may be configured to provide a rigid structure to the absorber.

In various embodiments of the above electrode, a spear may be coupled to the first head end of the electrode head, and the spear may extend through the core and the absorber body of the absorber. In various embodiments of the above electrode, the absorber body may comprise a first material and the core may comprise a second material, the first material may comprise a deformable material, and the second material may comprise a rigid material. In various embodiments of the above electrode, the absorber body may at least partially enclose the core.

In various embodiments, an electrode for a conducted electrical weapon is disclosed. The electrode may comprise an electrode head, an absorber, and an impact spreader. The electrode head may comprise a first head end opposite a second head end. The absorber may be coupled to the electrode head, and the absorber may comprise an expandable portion configured to deform radially outward. The impact spreader may be positioned forward the absorber, and the impact spreader may be configured to apply a force against the absorber to cause the expandable portion to deform radially outward.

In various embodiments of the above electrode, the impact spreader may be configured to apply the force in response to receiving an impact force. The impact force may cause the impact spreader to move in an axially aft direction, and movement in the axially aft direction may cause the impact spreader to apply the force. In various embodiments of the above electrode, the impact spreader may be positioned at least partially within the absorber. In various embodiments of the above electrode, the impact spreader may comprise at least one of a convex shape, a concave shape, a conical shape, a spherical shape, a square shape, a rectangular shape, a torus shape, or a ring shape. In various embodiments of the above electrode, a first diameter of an end of the impact spreader proximate the absorber may be less than a second diameter of the absorber.

In various embodiments, an impact spreader for an electrode of a conducted electrical weapon is disclosed. The impact spreader may be configured to cause an expandable portion of an absorber to deform radially outward responsive to an impact of the electrode. The impact spreader may comprise a spreader body, an opening, and a channel. The spreader body may comprise a first spreader end opposite a second spreader end. The opening may be defined on at least one of the first spreader end of the second spreader end. The channel may extend from the first spreader end through to the second spreader end, and the channel may be in fluid communication with the opening.

In various embodiments of the above impact spreader, the spreader body may comprise a concave shape. A first diameter of the first spreader end may be greater than a second diameter of the second spreader end. The first spreader end may define the opening into the spreader body.

In various embodiments of the above impact spreader, the spreader body may comprise a convex shape. A first diameter of the first spreader end may be greater than a second diameter of the second spreader end. The second spreader end may define the opening into the spreader body. The first spreader end may comprise a curved surface.

In various embodiments, an electrode for a conducted electrical weapon is disclosed. The electrode may comprise an electrode head, an absorber, and an impact spreader. The electrode head may comprise a first head end opposite a second head end. The absorber may be to the electrode head, the absorber may comprise a first absorber end opposite a second absorber end, and the absorber may comprise an expandable portion having a plurality of members extending in an axially forward direction from the first absorber end. The impact spreader may be positioned forward the first absorber end of the absorber, and the impact spreader may be configured to apply a force against the plurality of members of the expandable portion of the absorber.

In various embodiments of the above electrode, a spear may be coupled to the first head end of the electrode head, and the spear may extend through the absorber and the impact spreader. A first length of the spear may be greater than a second length of the impact spreader together with a third length of the absorber. The impact spreader may be disposed aft a front end of the spear. In various embodiments of the above impact spreader, the plurality of members may be arranged in a castellated nut shape, and the impact spreader may be disposed at least partially within the castellated nut shape. In various embodiments of the above impact spreader, the force applied by the impact spreader against the plurality of members may cause the plurality of members to deform radially outward. In various embodiments of the above impact spreader, the plurality of members may define a first diameter, and a second diameter of an end of the impact spreader proximate the absorber may be less than the first diameter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrode for a conducted electrical weapon comprising:
    an electrode body comprising a first body end opposite a second body end;
    an electrode head comprising a first head end opposite a second head end, wherein the second head end is coupled to the first body end of the electrode body; and
    a filament having a first filament end opposite a second filament end, wherein the first filament end is circumferentially wound onto the electrode head proximate the second head end to retain the first filament end onto the electrode head.

2. The electrode of claim 1, wherein the first filament end is circumferentially wound onto the electrode head to mechanically and electrically couple the filament to the electrode head.

3. The electrode of claim 1, wherein the filament is stowed within the electrode body.

4. The electrode of claim 3, wherein the filament is wound into a winding, and wherein the winding is stowed within the electrode body.

5. The electrode of claim 1, wherein the first filament end of the filament is circumferentially wound on to the electrode head proximate the coupling of the first body end to the second head end.

6. The electrode of claim 5, wherein the coupling of the first body end to the second head end comprises a deformed surface protruding radially inward towards the electrode head, and wherein the deformed surface contacts the first filament end of the filament to expose a conductive material of the filament against the electrode head.

7. The electrode of claim 5, wherein the first filament end of the filament extends forward the coupling of the first body end to the second head end.

8. The electrode of claim 1, wherein the first filament end of the filament is circumferentially wound on to the electrode head at and aft the coupling of the first body end to the second head end.

9. A filament winding for an electrode of a conducted electrical weapon, the filament winding comprising:
    a body winding section of the filament winding and stowed within a body of the electrode;
    a first head winding section of the filament winding circumferentially wound onto a head of the electrode, wherein the first head winding section is forward the body winding section; and
    a second head winding section of the filament winding circumferentially wound onto the head of the electrode, wherein the second head winding section is forward the first head winding section, and wherein at least one of the first head winding section or the second head winding section is configured to retain the filament winding onto the head of the electrode.

10. The filament winding of claim 9, wherein the first head winding section and the second head winding section are separated from the body winding section by a surface of the head of the electrode.

11. The filament winding of claim 9, wherein the first head winding section is separated from the second head winding section by a surface of the head of the electrode.

12. The filament winding of claim 9, wherein the first head winding section and the second head winding section are separated from the body winding section by a first surface of the head of the electrode, and wherein the first head winding section is separated from the second head winding section by a second surface of the head of the electrode.

13. The filament winding of claim 9, wherein the body winding section comprises a larger portion of the filament winding than the first head winding section and the second head winding section.

14. The filament winding of claim 9, wherein the first head winding section is configured to provide a strain relief to the filament winding.

15. The filament winding of claim 9, wherein the second head winding section is configured to at least one of mechanically or electrically couple the filament winding to the head of the electrode.

16. The filament winding of claim 9, wherein the second head winding section comprises a non-insulated portion of the filament winding configured to electrically couple to the head of the electrode.

17. An electrode for a conducted electrical weapon comprising:
 an electrode body comprising a first body end opposite a second body end;
 an electrode head comprising:
  a first head end opposite a second head end, wherein the second head end is coupled to the first body end of the electrode body; and
  a circumferential channel defined proximate the second head end; and
 a filament having a first filament end opposite a second filament end, wherein the first filament end is wound into the circumferential channel of the electrode head to retain the first filament end onto the electrode head.

18. The electrode of claim 17, wherein the circumferential channel comprises a plurality of circumferential channels.

19. The electrode of claim 18, wherein the first filament end is wound into at least two circumferential channels of the plurality of circumferential channels.

20. The electrode of claim 17, wherein the first filament end is at least one of mechanically or electrically coupled to the electrode head by the circumferential channel.

* * * * *